US012710158B2

(12) United States Patent
Van Bommel et al.

(10) Patent No.: US 12,710,158 B2
(45) Date of Patent: Aug. 18, 2026

(54) LIGHTING DEVICE WITH AN IMPROVED PERFORMANCE WHILE MIMICKING SUNLIGHT

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/126,329

(22) PCT Filed: Oct. 24, 2023

(86) PCT No.: PCT/EP2023/079607

§ 371 (c)(1),
(2) Date: May 1, 2025

(87) PCT Pub. No.: WO2024/094487

PCT Pub. Date: May 10, 2024

(65) Prior Publication Data

US 2026/0168648 A1 Jun. 18, 2026

(30) Foreign Application Priority Data

Nov. 1, 2022 (EP) .................................... 22204914

(51) Int. Cl.
*F21V 9/32* (2018.01)
*F21Y 105/10* (2016.01)
*F21Y 115/10* (2016.01)

(52) U.S. Cl.
CPC ............. *F21V 9/32* (2018.02); *F21Y 2105/10* (2016.08); *F21Y 2115/10* (2016.08)

(58) Field of Classification Search
CPC ..... F21V 9/32; F21Y 2105/10; F21Y 2115/10
See application file for complete search history.

(56) References Cited

U.S. PATENT DOCUMENTS

2010/0237766 A1* 9/2010 Baumgartner .......... F21K 9/232 445/3
2016/0212804 A1* 7/2016 Peeters ................ H10W 90/00
(Continued)

FOREIGN PATENT DOCUMENTS

CN 111380002 A 7/2020
GB 2583881 A * 11/2020 .............. A61L 2/10
(Continued)

*Primary Examiner* — Christopher E Dunay

(57) ABSTRACT

The invention provides a light generating system (1000) comprising (a) a plurality of sets (150) of light generating devices (100) and (b) a luminescent material (200), wherein: the light generating devices (100) are configured in an array (40); the light generating devices (100) are configured to generate device light (101); wherein the light generating devices (100) comprise solid state light sources; the plurality of sets (150) of light generating devices (100) comprises at least three sets (50) of light generating devices (100), wherein the light generating devices (100) of different sets mutually differ in peak wavelengths (λp) of the device light (101), wherein at least one set (50) of light generating devices (100) is configured to generate device light (111) having a peak wavelength (λpb) in the blue wavelength range, wherein at least two different sets (50) of light generating devices (100) are configured to generate device light (101) comprising UV radiation with at least two different peak wavelengths (λpu) in the UV wavelength range; and wherein the difference between the at least two different peak wavelengths (λpu) of the device light (101) is at least 30 nm; the luminescent material (200) is configured downstream of the array (40) of light generating devices (100); wherein the luminescent material (200) is configured to convert part of the device light (101) into luminescent material light (201); wherein at least 80% of a radiant flux of the luminescent material light (201) is due to conversion of the device light (111) having the peak wavelength (λpb)

(Continued)

in the blue wavelength range; and the light generating devices (100) and the luminescent material (200) are configured such that at least part of the device light (101) comprising UV radiation with at least two different peak wavelengths (λpu) in the UV wavelength range is transmitted by the luminescent material (200).

15 Claims, 5 Drawing Sheets

(56) References Cited

U.S. PATENT DOCUMENTS

| | | | | |
|---|---|---|---|---|
| 2018/0172219 | A1 | 6/2018 | Van Bommel et al. | |
| 2018/0368218 | A1 | 12/2018 | Petluri et al. | |
| 2019/0139943 | A1 | 5/2019 | Tiwari et al. | |
| 2020/0212265 | A1 | 7/2020 | Bae et al. | |
| 2020/0267814 | A1 | 8/2020 | Song et al. | |
| 2023/0408802 | A1* | 12/2023 | Cornelissen | G02B 19/0052 |
| 2024/0084999 | A1* | 3/2024 | Van Bommel | C09K 11/08 |
| 2024/0426462 | A1* | 12/2024 | Hikmet | F21V 13/08 |
| 2025/0052402 | A1* | 2/2025 | Oepts | F21V 9/38 |
| 2025/0180175 | A1* | 6/2025 | Van Bommel | F21K 9/00 |

FOREIGN PATENT DOCUMENTS

| | | | |
|---|---|---|---|
| WO | 2017080807 | A1 | 5/2017 |
| WO | 2020114894 | A1 | 6/2020 |
| WO | 2022039562 | A1 | 2/2022 |
| WO | 2022078805 | A1 | 4/2022 |
| WO | 2022218894 | A1 | 10/2022 |

* cited by examiner

LIGHTING DEVICE WITH AN IMPROVED PERFORMANCE WHILE MIMICKING SUNLIGHT

CROSS-REFERENCE TO PRIOR APPLICATIONS

This application is the U.S. National Phase application under 35 U.S.C. § 371 of International Application No. PCT/EP2023/079607, filed on Oct. 24, 2023, which claims the benefit of European Patent Application No. 22204914.0, filed on Nov. 1, 2022. These applications are hereby incorporated by reference herein.

FIELD OF THE INVENTION

The invention relates to a light generating system. The invention further relates to a lighting device comprising such light generating system.

BACKGROUND OF THE INVENTION

Wavelength converting lighting systems are known in the art. US20190139943A1, for instance, describes a lighting apparatus, a first group of at least one first solid state emitter, each first solid state emitter including a first light emitting diode ("LED") that, when excited, emits light having a peak wavelength in a range between about 440 nm and about 475 nm, and a second group of at least one second solid state emitter, each second solid state emitter comprising a second LED that, when excited, emits light having a peak wavelength in a range between about 390 nm and about 415 nm.

GB2583881A discloses a light-emitting diode based lighting system that combines ultraviolet (UV-A) and white light with an adjustable correlated colour temperature (CCT) value. The lighting system includes a first plurality of LEDs emitting red light and a second plurality of LEDs emitting blue light, and a photo-luminescent material for shifting the output of the second plurality of LEDs to produce white light. A further plurality of LEDs is provided emitting UV radiation having a wavelength in a range from approximately 315 nm to approximately 420 nm. A controller controls the groups of LEDs.

SUMMARY OF THE INVENTION

There appears to be a desire for artificial light that may have beneficial effects on humans. Further, there may be a desire to provide radiation that may have possible disinfection effects.

UV light has been used for disinfection for over 100 years. Wavelengths between about 190 nm and 300 nm may be strongly absorbed by nucleic acids, which may result in defects in an organism's genome. This may be desired for inactivating (killing), bacteria and viruses, but may (depending on the exposure levels) also have undesired side effects for humans. Therefore, the selection of wavelength of radiation, intensity of radiation and duration of irradiation may be limited in environments where people may reside such as offices, public transport, cinema's, restaurants, shops, etc., thus limiting the disinfection capacity. Especially in such environments, additional measures of disinfection may be advantageous to prevent the spread of bacteria and viruses such as influenza or novel (corona) viruses like COVID-19, SARS, and MERS.

It further appears desirable to produce systems, which provide alternative ways for air treatment, such as disinfection. Further, existing systems for disinfection may not easily be implemented in existing infrastructure, such as in existing buildings like offices, hospitality areas, etc. and/or may not easily be able to serve larger spaces. This may again increase the risk of contamination. Further, existing systems may not be efficient, or may be relatively bulky, and may also not easily be incorporated in functional devices. Other disinfection systems may use one or more anti-microbial and/or anti-viral means to disinfect a space or an object. Examples of such means may be chemical agents which may raise concerns. For instance, the chemical agents may also be harmful for people and pets.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

According to a first aspect, the invention provides a light generating system. In embodiments, the light generating system comprises (a) a plurality of sets of light generating devices and (b) a luminescent material. Especially, the light generating devices may be configured in an array. Further, in embodiments, the light generating devices may be configured to generate device light (or: "device radiation"). Especially, the light generating devices may comprise solid state light sources. The plurality of sets of light generating devices may, in embodiments, comprise at least two sets of light generating devices, especially at least three sets of light generating devices. Especially, light generating devices of different sets may mutually differ in peak wavelengths ($\lambda p$) of the device light. In embodiments, at least one set of light generating devices may be configured to generate device light having a peak wavelength ($\lambda pb$) in the visible wavelength range, especially in the blue wavelength range. Further, in embodiments, at least two different sets of light generating devices may be configured to generate device light having a wavelength in the UV-violet wavelength range. Especially, at least one set of light generating devices may be configured to generate device light comprising UV radiation. Even more especially, at least two different sets of light generating devices may be configured to generate device light comprising UV radiation. Such UV radiation may have at least two different peak wavelengths ($\lambda pu$) in the UV wavelength range. Yet further, in embodiments, the difference between the at least two different peak wavelengths ($\lambda pu$) of the device light may be at least 30 nm. In embodiments, the luminescent material may be configured downstream of the array of light generating devices. Especially, the luminescent material may be configured to convert at least part of the first device light into luminescent material light (or: "luminescent material radiation"). More especially, at least 60% of a radiant flux of the luminescent material light, such as at least 80% of a radiant flux of the luminescent material light, may be due to conversion of the device light having a peak wavelength ($\lambda pb$) in the blue wavelength range. Further, in embodiments, the light generating devices and the luminescent material may be configured such that at least part of the device light comprising the UV radiation with the at least two different peak wavelengths ($\lambda pu$) in the UV wavelength range may be transmitted by the luminescent material. Therefore, in embodiments the invention provides a light generating system comprising (a) a plurality of sets of light generating devices and (b) a luminescent material, wherein: the light generating devices are configured in an array, wherein the light generating devices are configured to generate device light, and wherein the light generating devices comprise solid state light sources; the plurality of sets of light generating devices comprises at least three sets of light generating devices, wherein the light generating devices of different sets mutually differ in peak wavelengths (λp) of the device light, wherein at least one set of light generating devices is configured to generate device light having a peak wavelength (λpb) in the blue wavelength range, wherein at least two different sets of light generating devices are configured to generate device light comprising UV radiation with at least two different peak wavelengths (λpu) in the UV wavelength range; and wherein the difference between the at least two different peak wavelengths (λpu) of the device light is at least 30 nm; the luminescent material is configured downstream of the array of light generating devices; wherein the luminescent material is configured to convert part of the device light into luminescent material light, and wherein at least 60%, more especially at least 80%, of a radiant flux of the luminescent material light is due to conversion of the device light having a peak wavelength (λpb) in the blue wavelength range; and the light generating devices and the luminescent material are configured such that at least part of the device light comprising the UV radiation with the at least two different peak wavelengths (λpu) in the UV wavelength range is transmitted by the luminescent material.

With such an invention, the light generating system may provide system light comprising a plurality of different wavelengths. Further, the system may especially provide such light by using a luminescent material, where the device light may be used to excite the luminescent material and provide luminescent material light. Further, the system may be provided in a single unit comprising a plurality of light generating devices, which may be particularly useful in many situations in practical use such as for home, work, industrial lighting (where it may be difficult to accommodate a complicated arrangement of many lighting devices). Yet further, the system may be used to provide visible light and UV light of different wavelengths. Further, with such an invention, a light generating system may be provided such that it may be used for disinfection in addition to illumination. Especially, such a light generating system may provide UV light Ultraviolet (UV) light (or: "UV radiation") has a wavelength between 100-380 nm and has many applications. For instance, UV light is part of the wavelength spectrum in sunlight. Humans and animals may benefit from the UV light in sunlight via e.g. the production of vitamin D3 in the skin. This may be especially important for global public health as it is estimated that up to 1 billion people worldwide may suffer from limited to severe vitamin D3 deficiency. Humans may be able to feel and sense UV light and some animals may be able to see (Near) UV light. Therefore, to adequately mimic sunlight, light for illumination may need to comprise UV light in its wavelength spectrum. Hence, a single lighting device may be provided that generates UV light with disinfecting capacity while remaining safe for human exposure and potentially has health and/or aesthetic benefits.

In embodiments, the device radiation may comprise visible light and UV radiation. UV radiation is light that may comprise a wavelength selected from the ultraviolet wavelength range. UV light has been used for disinfection for over 100 years. Wavelengths between about 190 nm and 300 nm may be strongly absorbed by nucleic acids, which may result in defects in an organism's genome. This may be desired for inactivating (killing), bacteria and viruses, but may also have undesired side effects for humans. Therefore, the selection of wavelength of radiation, intensity of radiation and duration of irradiation may be limited in environments where people may reside such as offices, public transport, cinema's, restaurants, shops, etc., thus limiting the disinfection capacity. Especially in such environments, additional measures of disinfection may be advantageous to prevent the spread of bacteria and viruses such as influenza or novel (corona) viruses like COVID-19, SARS, and MERS.

It appears desirable to produce systems, which provide alternative ways for air treatment, such as disinfection. Further, existing systems for disinfection may not easily be implemented in existing infrastructure, such as in existing buildings like offices, hospitality areas, etc. and/or may not easily be able to serve larger spaces. This may again increase the risk of contamination. Further, incorporation in HVAC systems may not lead to desirable effects and appears to be relatively complex. Further, existing systems may not be efficient, or may be relatively bulky, and may also not easily be incorporated in functional devices, such as e.g. luminaires. Other disinfection systems may use one or more anti-microbial and/or anti-viral means to disinfect a space or an object. Examples of such means may be chemical agents which may raise concerns. For instance, the chemical agents may also be harmful for people and pets.

In embodiments, the disinfecting light, may especially comprise ultraviolet (UV) radiation (and/or optionally violet radiation), i.e., the light may comprise a wavelength selected from the ultraviolet wavelength range (and/or optionally the violet wavelength range). However, other wavelengths are herein not excluded. The ultraviolet wavelength range is defined as light in a wavelength range from 100 to 380 nm and can be divided into different types of UV light/UV wavelength ranges (Table 1). Different UV wavelengths of radiation may have different properties and thus may have different compatibility with human presence and may have different effects when used for disinfection (Table 1).

TABLE 1

Properties of different types of UV, violet, and NIR wavelength light

| Name | Short name | Wavelength (nm) | (Relative) sterilization effectiveness Bacteria | (Relative) sterilization effectiveness Viruses | Safe Radiation | Vitamin D generation | Ozone generation |
|---|---|---|---|---|---|---|---|
| Near Infrared (deep red) | NIR | 780-950 | + | +/− | +++ | | |
| Violet | V | 380-420 | +/− | − | + | | |
| Ultra-violet A | UV-A | 315-380 | + | − | + | | |
| Ultra- | UV-B | 280-315 | + | +/− | +/− | + | |

TABLE 1-continued

Properties of different types of UV, violet, and NIR wavelength light

| Name | Short name | Wavelength (nm) | (Relative) sterilization effectiveness Bacteria | Viruses | Safe Radiation | Vitamin D generation | Ozone generation |
|---|---|---|---|---|---|---|---|
| violet B | | | | | | | |
| Near ultraviolet C | Near UV-C | 230-280 | ++ | ++ | − | | |
| Far ultra-violet C | Far UV-C | 190-230 | +++ | +++ | + | | +/− |
| Extreme ultraviolet C | Extreme UV-C | 100-190 | +++ | +++ | − | | + |

Each UV type/wavelength range may have different benefits and/or drawbacks. Relevant aspects may be (relative) sterilization effectiveness, safety (regarding radiation), and ozone production (as result of its radiation). Depending on an application a specific type of UV light or a specific combination of UV light types may be selected and provides superior performance over other types of UV light. UV-A may be (relatively) safe and may inactivate (kill) bacteria, but may be less effective in inactivating (killing) viruses. UV-B may be (relatively) safe when a low dose (i.e. low exposure time and/or low intensity) is used, may inactivate (kill) bacteria, and may be moderately effective in inactivating (killing) viruses. UV-B may also have the additional benefit that it can be used effectively in the production of vitamin D in a skin of a person or animal. Near UV-C may be relatively unsafe, but may effectively inactivating, especially kill bacteria and viruses. Far UV-C may also be effective in inactivating (killing) bacteria and viruses, but may be (relatively to other UV-C wavelength ranges) (rather) safe. Far-UV light may generate some ozone which may be harmful for human beings and animals. Extreme UV-C may also be effective in inactivating (killing) bacteria and viruses, but may be relatively unsafe. Extreme UV-C may generate ozone which may be undesired when exposed to human beings or animals. In some application ozone may be desired and may contribute to disinfection, but then its shielding from humans and animals may be desired. Hence, in the table "+" for ozone production especially implies that ozone is produced which may be useful for disinfection applications, but may be harmful for humans/animals when they are exposed to it. Hence, in many applications this "+" may actually be undesired while in others, it may be desired. The types of light indicated in above table may in embodiments be used to sanitize air and/or surfaces.

The terms "inactivating" and "killing" with respect to a virus may herein especially refer to damaging the virus in such a way that the virus can no longer infect and/or reproduce in a host cell, i.e., the virus may be (essentially) harmless after inactivation or killing.

Hence, in embodiments, the light may comprise a wavelength in the UV-A range. In further embodiments, the light may comprise a wavelength in the UV-B range. In further embodiments, the light may comprise a wavelength in the Near UV-C range. In further embodiments, the light may comprise a wavelength in the Far UV-C range. In further embodiments, the light may comprise a wavelength in the extreme UV-C range. The Near UV-C, the Far UV-C and the extreme UV-C ranges may herein also collectively be referred to as the UV-C range. Hence, in embodiments, the light may comprise a wavelength in the UV-C range. In other embodiments, the light may comprise violet radiation.

Hence, light or radiation described herein may also be indicated as disinfection light.

As mentioned before, the invention may provide a light generating system (or "system") configured to generate system light, wherein the light generating system may comprise (a) a plurality of sets of light generating devices and (b) a luminescent material.

Especially, the light generating devices may be configured in an array, for example the light generating devices may be arranged along a line or alternatively, the light generating devices may be arranged in a 1D array or 2D array. The array may be regular, random, or quasi random. Especially, in embodiments the array may be a regular 1D array or a regular 2D array. However, other arrays, like a phyllotaxis tessellation or a sunflower tessellation, may also be possible. Especially, however, the array may be a regular array. In embodiments, the array is an n*m array, wherein n and m are each individually selected from the range of at least 3. In specific embodiments, n and m are each individually selected from the range of 3-100. Hence, in embodiments there may be one or two constant pitches. The term "tessellation" may herein especially refer to a pattern of (repeated) shapes, especially polygons, which fit together closely without gaps or overlapping. Note however, that the array may also be a 1D array, such as e.g. when a filament is applied.

Further, in embodiments, the light generating devices may be configured to generate device light. Here, "device light" may be different from "system light". Device light may refer to light generated by the one or more light generating devices. System light may refer to the light generated by the light generating system. Especially, the system light may comprise the device light. Further, the system light may (also) comprise other light, for example luminescent material light (or "converted device light", or "converted light").

In embodiments, the light generating device may not be limited only to a device to generate device light i.e. in embodiments, the light generating device may also comprise additional components or a package of light generating elements such as mirrors, lenses, reflectors, collimators, etc. to facilitate generation and propagation of light. Hence, the light generating device may not be limited to a light source, but may be a device comprising the light source and additional elements to provide or generate device light.

A light generating device may especially be configured to generate device light. Especially, the light generating device may comprise a light source. The light source may especially configured to generate light source light. In embodiments, the device light may essentially consist of the device light. In other embodiments, the device light may essentially consist of converted light source light. In yet other embodiments, the device light may comprise (unconverted) light source light and converted light source light. Light source light may be converted with a luminescent material into luminescent material light and/or with an upconverter into upconverted light (see also below). The term "light generating device" may also refer to a plurality of light generating devices which may provide device light having essentially the same spectral power distributions. In specific embodiments, the term "light generating device" may also refer to a plurality of light generating devices which may provide device light having different spectral power distributions.

The term "light source" may in principle relate to any light source known in the art. It may be a conventional (tungsten) light bulb, a low pressure mercury lamp, a high pressure mercury lamp, a fluorescent lamp, an LED (light emissive diode). More especially, the light generating devices may in embodiments comprise solid state light sources. In a specific embodiment, the light source comprises a solid state LED light source (such as an LED or laser diode (or "diode laser")). The term "light source" may also relate to a plurality of light sources, such as 2-2000 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light source may be configured on the same substrate. In embodiments, a COB is a multi LED chip configured together as a single lighting module. The term "light source" may also refer to a chip scaled package (CSP). A CSP may comprise a single solid state die with provided thereon a luminescent material comprising layer. The term "light source" may also refer to a midpower package. A midpower package may comprise one or more solid state die(s). The die(s) may be covered by a luminescent material comprising layer. The die dimensions may be equal to or smaller than 2 mm, such as in the range of e.g. 0.2-2 mm. Hence, in embodiments the light source comprises a solid state light source. Further, in specific embodiments, the light source comprises a chip scale packaged LED. Herein, the term "light source" may also especially refer to a small solid state light source, such as having a mini size or micro size. For instance, the light sources may comprise one or more of mini LEDs and micro LEDs. Especially, in embodiment the light sources comprise micro LEDs or "microLEDs" or "μLEDs". Herein, the term mini size or mini LED especially indicates to solid state light sources having dimensions, such as die dimension, especially length and width, selected from the range of 100 μm-1 mm. Herein, the term p size or micro LED especially indicates to solid state light sources having dimensions, such as die dimension, especially length and width, selected from the range of 100 μm and smaller.

The light source may have a light escape surface. Referring to conventional light sources such as light bulbs or fluorescent lamps, it may be an outer surface of a glass or a quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode (OLED), such as a passive-matrix (PMOLED) or an active-matrix (AMOLED). In a specific embodiment, the light source comprises a solid-state light source (such as an LED or laser diode). In an embodiment, the light source comprises an LED (light emitting diode). The terms "light source" or "solid state light source" may also refer to a superluminescent diode (SLED). The term LED may also refer to a plurality of LEDs. The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as an LED, or downstream of a plurality of solid-state light sources (i.e. e.g. shared by multiple LEDs). In embodiments, the light source may comprise an LED with on-chip optics. In embodiments, the light source comprises pixelated single LEDs (with or without optics) (offering in embodiments on-chip beam steering). In embodiments, the light source may be configured to provide primary radiation, which is used as such, such as e.g. a green light source, such as a green LED, or a red light source, such as a red LED, but in embodiments especially a blue light source, like a blue LED. Such LEDs, which may not comprise a luminescent material ("phosphor") may be indicated as direct color LEDs. In other embodiments, however, the light source may be configured to provide primary radiation and part of the primary radiation may be converted into secondary radiation. Secondary radiation may be based on conversion by a luminescent material. The secondary radiation may therefore also be indicated as luminescent material radiation. The luminescent material may in embodiments be comprised by the light source, such as an LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as an LED with a luminescent material layer not in physical contact with a die of the LED.

Hence, in specific embodiments the light source may be a light source that during operation emits at least light at a wavelength selected from the range of 100-3000 nm. Especially, a light source may emit at least light at a wavelength selected from the range of 100-380 nm as UV radiation. Another light source, optionally in combination with the luminescent material, may emit at least light at a wavelength selected from the range of 380-780 nm as visible light, such as e.g. white light, or blue light, or red light, or green light.

The terms "visible", "visible light" or "visible emission" and similar terms refer to light having one or more wavelengths in the range of about 380-780 nm. In alternative embodiments, another light source may emit at least light at a wavelength selected from the range of 780-3000 nm, such as 780-2000 nm, e.g. a wavelength up to about 1500 nm, like a wavelength of at least 900 nm, as infrared (IR) radiation. The term IR radiation may in specific embodiments refer to near IR radiation (NIR). Therefore, herein also the term "(N)IR" is applied, to refer to in general IR, and in specific embodiments to NIR. Hence, the term IR may herein refer to one or more of near infrared (NIR (or IR-A)) and short-wavelength infrared (SWIR (or IR-B)), especially NIR. However, in embodiments other wavelengths may also be possible. The light source light may partially be used by the luminescent material. Within the wavelength spectrum of visible light, the terms "violet light" or "violet emission" especially relates to light having a wavelength in the range of about 380-420 nm. The terms "blue light" or "blue emission" especially relates to light having a wavelength in the range of about 420-495 nm, more especially in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm. The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 420-495 nm wavelength range, such as in the 440-495 nm wavelength range. The phrase "UV-violet", and similar phrases, may especially refer to radiation having a wavelength selected from the wavelength range of 100-420 nm. The term "violet-blue wavelength range" may especially refer to the 380-495 nm wavelength range.

The term "white light", and similar terms, herein, is known to the person skilled in the art. It may especially relate to light having a correlated color temperature (CCT) between about 1800 K and 20000 K, such as between 2000 and 20000 K, especially 2700-20000 K, for general lighting especially in the range of about 2000-7000 K, such as in the range of 2700 K and 6500 K. In embodiments, e.g. for backlighting purposes, or for other purposes, the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL. In specific embodiments, the correlated color temperature (CCT) may be selected from the range of 6000-12000 K, like selected from the range of 7000-12000 K, like at least 8000 K. Yet further, in embodiments the correlated color temperature (CCT) may be selected from the range of 6000-12000 K, like selected from the range of 7000-12000 K, in combination with a CRI of at least 70.

In embodiments, the system light may be white light having a correlated color temperature in a range from 1800 to 6500 K. Here, the correlated color temperature (CCT) is a measure of light source color appearance defined by the proximity of the light source's chromaticity coordinates to the blackbody locus, as a single number rather than the two required to specify a chromaticity. Further, in embodiments, the system light may have a color rendering index of at least 80, such as at least 85, especially at least 90. A color rendering index (CRI) is a quantitative measure of the ability of a light source to reveal the colors of various objects faithfully in comparison with a natural or standard light source. The CRI is determined by the light source's spectrum. The value often quoted as "CRI" on commercially available lighting products is properly called the CIE Ra value, "CRI" being a general term and CIE Ra being the international standard color rendering index. Numerically, the highest possible CIE Ra value is 100 and would only be given to a source whose spectrum is identical to the spectrum of daylight, very close to that of a black body (incandescent lamps are effectively black bodies), dropping to negative values for some light sources.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape,) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term "light source" herein may also refer to a light source comprising a solid state light source, such as an LED or a laser diode or a superluminescent diode.

The term "light source" may (thus) in embodiments also refer to a light source that is (also) based on conversion of light, such as a light source in combination with a luminescent converter material. Hence, the term "light source" may also refer to a combination of an LED with a luminescent material configured to convert at least part of the LED radiation, or to a combination of a (diode) laser with a luminescent material configured to convert at least part of the (diode) laser radiation. In embodiments, the term "light source" may also refer to a combination of a light source, like an LED, and an optical filter, which may change the spectral power distribution of the light generated by the light source. Especially, the term "light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a diode laser, or a superluminescent diode.

In embodiments, the plurality of light generating devices may comprise sets of light generating devices. A set of light generating devices may comprise at least a single light generating device, more especially a plurality of light generating devices which share at least one (essentially) identical feature. All the light generating devices in the set may share the at least one identical feature. Especially, the identical feature may be a feature that distinguishes the set of light generating devices from another set of light generating devices sharing at least one different feature. All the light generating devices in the other set may share the at least one different feature. For example, a set of light generating devices may comprise a plurality of light generating devices generating device light with a wavelength in the UV range, distinguished from another set of light generating devices that may comprise a plurality of light generating devices generating device light with a wavelength in the visible spectrum.

In embodiments, the plurality of sets of light generating devices may comprise at least two sets of light generating devices, especially at least three sets of light generating devices. Especially, light generating devices of different sets may mutually differ in peak wavelengths of the device light. The device light may have a spectral distribution of wavelengths, wherein a specific wavelength corresponding to the highest intensity may be the peak wavelength. Therefore, in embodiments, the (each) light generating device may have a unique peak wavelength and hence, the one or more light generating devices may have one or more peak wavelengths, where each set of the light generating devices may have a different peak wavelength from the other sets.

In embodiments, the light generating system may comprise a plurality of sets of light generating devices, such as at least three sets, such as at least four sets, especially at least six sets, such as in embodiments at maximum ten sets.

Especially, at least one set of light generating devices may be configured to generate device light having a peak wavelength ($\lambda pb$). The peak wavelength may especially be in the visible wavelength range, especially the blue wavelength range. Optionally in embodiments, the at least one set of light generating devices with a peak wavelength in the visible spectrum may be at least two sets of light generating devices with a peak wavelength ($\lambda pb$) in the visible spectrum. Hence the peak wavelengths ($\lambda pb$) in the visible spectrum may in such embodiments comprise multiple peak wavelengths, such as e.g. a first peak wavelength ($\lambda pb_1$) in the visible spectrum (especially the blue wavelength range) and a second peak wavelength ($\lambda pb_2$) in the visible spectrum (especially the blue wavelength range). Further, embodiments may comprise p different sets of light generating devices configured to generate device light comprising visible light with p different peak wavelengths ($\lambda pb_p$) in the visible spectrum (especially the blue wavelength range). In embodiments, $p \geq 1$, such as $p \geq 2$, moreover $p \geq 3$. In embodiments, $p \leq 10$.

Further, at least one, more especially at least two different sets of light generating devices may be configured to generate device light comprising UV radiation. This device light may have at least two different peak wavelengths ($\lambda pu$) in the UV wavelength range, such as at least a first peak wavelength ($\lambda pu_1$) in the UV wavelength range and a second peak wavelength ($\lambda pu_2$) in the UV wavelength range. Optionally, in embodiments the at least two different sets of light generating devices may comprise at least three different sets of light generating devices or at least four different sets of light generating devices. Hence the different peak wavelengths ($\lambda pu$) in the UV wavelength range may in such embodiments comprise further peak wavelengths, such as e.g. a third peak wavelength ($\lambda pu_3$) in the UV wavelength range or a fourth peak wavelength ($\lambda pu_4$) in the UV wavelength range. Further, in embodiments the system may comprise k different sets of light generating devices configured to generate device light comprising UV radiation with k different peak wavelengths ($\lambda pu_k$) in the UV wavelength range.

Yet further, in embodiments, the difference between the at least two different peak wavelengths ($\lambda pu$) of the device light may be at least 30 nm, such as at least 40 nm, especially at least 50 nm, moreover at least 60 nm. Despite this difference between the at least two different peak wavelengths ($\lambda pu$) of the device light comprising UV radiation, both may remain within the UV wavelength range of 100-380 nm, such as especially in the (relatively safe) 190-380 nm wavelength range, for example in the (relatively safer) 230-380 nm wavelength range. In embodiments with k different sets of light generating devices configured to generate device light comprising UV radiation with k different peak wavelengths ($\lambda pu_k$) in the UV wavelength range, the difference between at least two different peak wavelengths ($\lambda pu$) of the device light may be at least 30 nm, such as at least 40 nm, especially at least 50 nm, moreover at least 60 nm, but the difference may not necessarily be at least 30 nm, such as at least 40 nm, especially at least 50 nm, moreover at least 60 nm between all the k different peak wavelengths ($\lambda pu_k$) in the UV wavelength range. For example, in an embodiment where k=4, four different sets of light generating devices may have peak wavelengths at 190 nm, 220 nm, 270 nm, and 290 nm, respectively. The largest difference between these peak wavelengths (190 nm and 290 nm) may in such an embodiment be larger than at least 30 nm, but in embodiments also especially at least larger than 60 nm, at 100 nm. Smaller differences between these peak wavelengths (190 nm and 220 nm; 190 nm and 270 nm; 220 nm and 270 nm; 220 nm and 290 nm; 270 nm and 290 nm) may in such embodiments not necessarily be at least 30 nm, but may, however, especially be at least 15 nm.

Hence, with the current invention, the light generating system may comprise at least one set of light generating devices generating visible light, especially blue light, and at least two sets of different light generating devices generating different UV light. Alternative embodiments of the light generating system may comprise p sets of light generating devices generating visible light, especially blue light, and k sets of different light generating devices generating different UV light. Hence in embodiments, the light generating system may comprise a total of n sets of light generating devices comprising p sets of light generating devices generating visible light and k sets of different light generating devices generating different UV light. In general, n=p+k. In embodiments, p≥1 and k≥1, such that n≥2. Especially, in embodiments p≥1 and k≥2, such that n≥3. In embodiments where n≥4, certain embodiments may be configured comprising p≥2 and k≥2, and other embodiments may be configured comprising p≥1 and k≥3.

In embodiments, the luminescent material may be configured downstream of the array of light generating devices. Here, the luminescent material may be configured along the path of the device light which escapes from the light generating device(s). The luminescent material may be configured to convert part of the device light into luminescent material light. The luminescent material may especially be configured to convert at least part of the device light with a peak wavelength (λpb) in the visible wavelength range into luminescent material light. Hence, at least part of the device light having a first peak wavelength ($\lambda pb_1$) in the visible spectrum may be converted into luminescent material light. In embodiments, at least part of device light having p different peak wavelengths ($\lambda pb_p$) in the visible spectrum may be converted into luminescent material light, wherein p is at least one (such as two or more).

Alternatively or additionally, in embodiments, at least a part of the device light with at least two different peak wavelengths (λpu) in the UV wavelength range may be converted into luminescent material light. At least part of the device light having a first peak wavelength ($\lambda pu_1$) in the UV wavelength range may be converted into luminescent material light. In embodiments, at least part of the device light having k different peak wavelengths ($\lambda pu_k$) in the UV wavelength range may be converted into luminescent material light, wherein k is at least two (such as three or more).

The luminescent material may convert light (for example device light) of one wavelength into light of another wavelength (such as the luminescent material light). However, the intensity of the converted luminescent material light may be in dependence of the wavelength of the device light incident on the luminescent material. Hence, in embodiments, the luminescent material may have different excitation intensities at the different peak wavelengths (e.g. $\lambda pb_1$, $\lambda pu_1$, and $\lambda pu_2$; or $\lambda pb_p$ and $\lambda pu_k$). Hence, luminescent material light of high intensity may be generated by selecting the peak wavelength of the one or more sets of light generating devices equal to the wavelength at which the luminescent material has a high excitation intensity.

Instead of the term "excitation intensity", and similar terms, effectively also the term "oscillator strength" may be applied. In embodiments, a luminescent material and light generating devices are selected wherein a first set of light generating devices have a peak length at wavelength where the luminescent material has a first oscillator strength ($O_1$), and another set of light generating devices ($n^{th}$ type) having a peak wavelength $\lambda_n$ where the luminescent material has an nth oscillator strength ($O_n$), wherein $O_n/O_1 \leq 0.5$, such as $O_n/O_1 \leq 0.2$, like in embodiments $O_n/O_1 \leq 0.1$. The "another type" of light generating devices ($n^{th}$ type) may e.g. be the light generating devices generating different device light in the UV wavelength range. In embodiments, the value of $O_n$ may decrease with the value of n.

Especially, the luminescent material may be configured in the transmissive mode. In the transmissive mode, it may be relatively easy to have light source light admixed in the luminescent material light, which may be useful for generating the desirable spectral power distribution. In the reflective mode, thermal management may be easier, as a substantial part of the luminescent material may be in thermal contact with a thermally conductive element, like a heatsink or heat spreader. Hence, would any device light escape from the system, in embodiments this may only via transmission through the luminescent material. Luminescent materials and embodiments comprising such are discussed in more detail (see further below).

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex} < \lambda_{em}$), though in specific embodiments the luminescent material may comprise up-converter luminescent material, i.e. radiation of a larger wavelength is converted into radiation with a smaller wavelength ($\lambda_{ex} > \lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials. Examples of possible luminescent materials are indicated below. Hence, the term "luminescent material" may in specific embodiments also refer to a luminescent material composition. Instead of the term "luminescent material" also the term "phosphor" may be applied. These terms are known to the person skilled in the art.

In embodiments, luminescent materials are selected from garnets and nitrides, especially doped with trivalent cerium or divalent europium, respectively. The term "nitride" may also refer to oxynitride or nitridosilicate, etc. Alternatively or additionally, the luminescent material(s) may be selected from silicates, especially doped with divalent europium.

In specific embodiments the luminescent material comprises a luminescent material of the type $A_3B_5O_{12}$:Ce, wherein A in embodiments comprises one or more of yttrium (Y), lanthanum (La), gadolinium (Gd), terbium (Tb) and lutetium (Lu), especially (at least) one or more of Y, Gd, Tb and Lu, and wherein B in embodiments comprises one or more of aluminum (Al), gallium (Ga), indium (In) and scandium (Sc). Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least Y or Lu and wherein B comprises at least Al. Such garnets may be doped with cerium (Ce), with praseodymium (Pr) or a combination of Ce and Pr; especially however with Ce. Especially, B may comprise Al; however, in addition to aluminum, B may also partly comprise Ga and/or Sc and/or In, especially up to about 20% of B, more especially up to about 10% of B (i.e. the B ions essentially consist of 90 or more mole % of Al and 10 or less mole % of one or more of Ga, Sc and In); B may especially comprise up to about 10% Ga. In another variant, B and O may at least partly be replaced by silicon (Si) and nitrogen (N). The element A may especially be selected from the group consisting of Y, Gd, Tb and Lu. Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq0.2$, wherein $y1+y2=1$, wherein $0\leq y2\leq0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as $>0.2$, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (optionally in combination with (the) light of other sources of light as described herein). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3\leq0.1$, and wherein $0\leq y2\leq0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein $x1+x3=1$, and wherein $0<x3\leq0.2$, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga, In and Sc, wherein $x1+x2+x3=1$, wherein $x3>0$, wherein $0<x2+x3\leq0.2$, wherein $y1+y2=1$, wherein $0\leq y2\leq0.2$. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Alternatively or additionally, wherein the luminescent material may comprises a luminescent material of the type $A_3Si_6N_{11}:Ce^{3+}$, wherein A comprises one or more of Y, La, Gd, Tb and Lu, such as in embodiments one or more of La and Y.

In embodiments, the luminescent material may alternatively or additionally comprise one or more of $MS:Eu^{2+}$ and/or $M_2Si_5N_8:Eu^{2+}$ and/or $MAlSiN_3:Eu^{2+}$ and/or $Ca_2AlSi_3O_2N_5:Eu^{2+}$, etc., wherein M comprises one or more of barium (Ba), strontium (Sr) and calcium (Ca), especially in embodiments at least Sr. Hence, in embodiments, the luminescent may comprise one or more materials selected from the group consisting of (Ba,Sr,Ca)S:Eu, (Ba,Sr,Ca)$AlSiN_3$:Eu and (Ba,Sr,Ca)$_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent Eu will in general replace divalent cations, such as the above divalent alkaline earth cations, especially Ca, Sr, or Ba. The material (Ba,Sr,Ca)S:Eu can also be indicated as MS:Eu, wherein M is one or more elements selected from the group consisting of Ba, Sr, and Ca; especially, M comprises in this compound Ca or Sr, or Ca and Sr, more especially Ca. Here, Eu is introduced and replaces at least part of M (i.e. one or more of Ba, Sr, and Ca). Further, the material (Ba,Sr,Ca)$_2Si_5N_8$:Eu can also be indicated as $M_2Si_5N_8$:Eu, wherein M is one or more elements selected from the group consisting of Ba, Sr, and Ca; especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material (Ba,Sr,Ca)$AlSiN_3$:Eu can also be indicated as $MAlSiN_3$:Eu, wherein M is one or more elements selected from the group consisting of Ba, Sr, and Ca; especially, M comprises in this compound Ca or Sr, or Ca and Sr, more especially Ca. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca)$AlSiN_3$:Eu and (Ba,Sr,Ca)$_2Si_5N_8$:Eu. In these compounds, Eu is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent Eu will in general replace divalent cations, such as the above divalent alkaline earth cations, especially Ca, Sr, or Ba.

The material (Ba,Sr,Ca)S:Eu can also be indicated as MS:Eu, wherein M is one or more elements selected from the group consisting of Ba, Sr, and Ca; especially, M comprises in this compound Ca or Sr, or Ca and Sr, more especially Ca. Here, Eu is introduced and replaces at least part of M (i.e. one or more of Ba, Sr, and Ca).

Further, the material (Ba,Sr,Ca)$_2Si_5N_8$:Eu can also be indicated as $M_2Si_5N_8$:Eu, wherein M is one or more elements selected from the group consisting of Ba, Sr, and Ca; especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca).

Likewise, the material (Ba,Sr,Ca)$AlSiN_3$:Eu can also be indicated as $MAlSiN_3$:Eu, wherein M is one or more elements selected from the group consisting of Ba, Sr, and Ca; especially, M comprises in this compound Ca or Sr, or Ca and Sr, more especially Ca. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5$:$Ce^{3+}$), or similar compounds, or BAM ($BaMgAl_{10}O_{17}$:$Eu^{2+}$), or similar compounds.

The term "luminescent material" herein especially relates to inorganic luminescent materials.

Alternatively or additionally, also other luminescent materials may be applied. For instance quantum dots and/or organic dyes may be applied and may optionally be embedded in transmissive matrices like e.g. polymers, like poly (methyl methacrylate) (PMMA), or polysiloxanes, etc. Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium (Cd)-free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use Cd-free quantum dots or at least quantum dots having a very low Cd content. Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nanowires, etcetera. Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent Eu containing nitrides, divalent Eu containing oxynitrides, divalent Eu containing silicates, Ce comprising garnets, and quantum structures. Quantum structures may e.g. comprise quantum dots or quantum rods (or other quantum type particles) (see above). Quantum structures may also comprise quantum wells. Quantum structures may also comprise photonic crystals.

In other embodiments, further other luminescent materials may comprise the type $M'_xM_{2-2x}AX_6$, especially, a Mn(IV) ("tetravalent manganese") type luminescent material. Hence, in an embodiment the luminescent material comprises a (red) luminescent material selected from the group consisting of Mn(IV) luminescent materials, even more especially the luminescent material comprises a luminescent material of the type $M'_xM_{2-2x}AX_6$ doped with tetravalent manganese: wherein M' may comprise an alkaline earth cation; wherein M may comprise an (alkaline) cation, and x may be in the range of 0-1; wherein A may comprise a tetravalent cation, which may in specific embodiments at least comprise Si; wherein X may comprise a monovalent anion, which may at least comprising Fluorine (F). M relates to monovalent cations, such as selected from the group consisting of potassium (K), rubidium (Rb), lithium (Li), sodium (Na), cesium (Cs), and especially M comprises at least one or more of K and Rb. Preferably, at least 80%, even more preferably at least 90%, such as 95% of M consists of K and/or Rb. The cation A may comprise one or more of Si, titanium (Ti), germanium (Ge), stannum (Sn) and zinc (Zn). Preferably, at least 80%, even more preferably at least 90%, such as at least 95% of A consists of Si and/or Ti and/or Ge (not taking into account the partial replacement by $Mn^{4+}$).

Relevant alkaline earth cations (M') are magnesium (Mg), strontium (Sr), calcium (Ca) and barium (Ba). In an embodiment, a combination of different alkaline cations may be applied. In yet another embodiment, a combination of different alkaline earth cations may be applied. In yet another embodiment, a combination of one or more alkaline cations and one or more alkaline earth cations may be applied. In embodiments, x may thus be in the range of 0-1, especially $x<1$. In an embodiment, $x=0$.

Especially, M comprises K and A comprises silicon. X relates to a monovalent anion, but especially at least comprises F. Other monovalent anions that may optionally be present may be selected from the group consisting of chlorine (Cl), bromine (Br), and iodine (I). Preferably, at least 80%, even more preferably at least 90%, such as 95% of X consists of F. The term "tetravalent manganese" refers to $Mn^{4+}$. This is a well-known luminescent ion. In the formula as indicated above, part of the tetravalent cation A (such as Si) is being replaced by manganese. Hence, $M_2AX_6$ doped with tetravalent manganese may also be indicated as $M_2A_{1-m}Mn_mX_6$. The mole percentage of manganese, i.e. the percentage it replaces the tetravalent cation A will in general be in the range of 0.1-15%, especially 1-12%, i.e. m is in the range of 0.001-0.15, especially in the range of 0.01-0.12. Further embodiments may be derived from WO2013/088313, which is herein incorporated by reference.

Hence, in an embodiment the luminescent material comprises $M_2AX_6$ doped with tetravalent manganese, wherein M comprises an alkaline cation, wherein A comprises a tetravalent cation, and wherein X comprises a monovalent anion, at least comprising F. Even more especially, wherein M comprises at least one or more of K and Rb, wherein A comprises one or more of Si and Ti, and wherein X=F. An example of a suitable luminescent material is e.g. $K_2SiF_6$:Mn (5%) (i.e. $K_2Si(bx)Mn_xF_6$, with x=0.05). Here, M is substantially 100% K, A is substantially 100% Si, but with a replacement thereof with 5% Mn (thus effectively 95% Si and 5% Mn), and X is substantially 100% F. In specific embodiments, M is essentially K. Such luminescent material may especially emit in the red, due to the tetravalent manganese. In embodiments, M comprises K and A comprises silicon. Hence, in embodiments a particulate luminescent material comprises $K_2SiF_6$ doped with tetravalent manganese. Note that when there are different luminescent materials, the weight percentage and/or y/x ratios relate to each type of luminescent material, respectively. Hence, in specific embodiments the luminescent material may comprise Mn comprising $M_2(Si,Ti)X_6$, more especially Mn comprising $K_2(Si,Ti)F_6$, wherein "Si,Ti" refers to one or more of Si and Ti. Luminescent materials may also be selected from the group of $K_2[SiF_6]:Mn^{4+}$, $Na_2[SiF_6]:Mn^{4+}$, $K_2[TiF_6]:Mn^{4+}$, $Ba[TiF_6]:Mn^{4+}$, $K_2[SnF_6]:Mn^{4+}$, $Na_2[TiF_6]:Mn^{4+}$, $KRb[TiF_6]:Mn^{4+}$ and $K_2[Si_{0.5}Ge_{0.5}F_6]:Mn^{4+}$, though further options may also be possible.

The luminescent material may be comprised by a luminescent body. The luminescent body may be a layer, like a self-supporting layer. The luminescent body may also be a coating. The luminescent body may also comprise a luminescent coating on a support (especially a light transmissive support in the transmissive mode). Especially, the luminescent body may essentially be self-supporting. In embodiments, the luminescent material may be provided as luminescent body, such as a luminescent single crystal, a luminescent glass, or a luminescent ceramic body. Such body may be indicated as "converter body" or "luminescent body". In embodiments, the luminescent body may be a luminescent single crystal or a luminescent ceramic body. For instance, in embodiments a Ce comprising garnet luminescent material may be provided as a luminescent single crystal or as a luminescent ceramic body. In other embodiments, the luminescent body may comprise a light transmissive body, wherein the luminescent material is embedded. For instance, the luminescent body may comprise a glass body, with luminescent material embedded therein. Or, the glass as such may be luminescent. In other embodiments, the luminescent body may comprise a polymeric body, with luminescent material embedded therein.

The luminescent material may not convert all light incident on the luminescent material, rather some of the light may be transmitted (in the transmissive mode) or reflected (in the reflective mode). The transmitted light may thus comprise unconverted light. Hence, at least a part of the light incident on the luminescent material may be transmitted at the same wavelength of the incident light. The reflected light may be redirected back into the light system. At least part of the reflected light may hence not be comprised by the system light. In certain embodiments, at least part of the reflected light may be redirected to be incident on the luminescent material where it may be converted, transmitted, or reflected.

In embodiments, the light generating devices and the luminescent material may be configured such that at least part of the different device light comprising UV radiation is transmitted by the luminescent material (in the transmissive mode). In embodiments, at least part of the device light with the first peak wavelength ($\lambda pu_1$) in the UV wavelength range and at least part of the device light with a second different peak wavelength ($\lambda pu_2$) in the UV wavelength range may be transmitted (in the transmissive mode) by the luminescent material. Further, in embodiments with a k different peak wavelength ($\lambda pu_k$) in the UV wavelength range, at least part of the device light having k different peak wavelength ($\lambda pu_k$) in the UV wavelength range may be transmitted (in the transmissive mode) by the luminescent material. Hence, the light generating devices and the luminescent material may be configured such that at least part of the device light comprising UV radiation with the at least two different peak wavelengths in the UV wavelength range ($\lambda$pu) is transmitted by the luminescent material. Therefore, system light comprising a plurality of (peak) wavelengths may be outcoupled from the light generating system. Especially, the system light may comprise device light (transmitted by the luminescent material), and luminescent material light (due to conversion of the device light by the luminescent material). Hence, the spectral power distribution of the system light may be selected by combining the different aforementioned wavelengths.

Especially, in embodiments the light generating devices and the luminescent material may be configured such that at least part of the device light having a peak wavelength ($\lambda$pb) in the visible spectrum is transmitted by the luminescent material and at least part of said device light is converted by the luminescent material into luminescent material light.

As mentioned before, the device light and the luminescent material may be selected such that the peak wavelength of the device light is equal to the wavelength for which the luminescent material has a high excitation intensity; especially the luminescent material may have a (relatively) highest excitation intensity for the device light having a peak wavelength ($\lambda$pb) in the visible spectrum. Hence, in embodiments, at least one set of light generating devices may have a peak wavelength substantially equal to the wavelength at which the luminescent material may have the highest excitation intensity. Especially, the at least one set of light generating devices generating device light having a peak wavelength ($\lambda$pb) in the visible spectrum may have a peak wavelength substantially equal to the wavelength at which the luminescent material may have the highest excitation intensity.

In embodiments, the peak wavelength ($\lambda$pb) in the visible spectrum may be selected at a wavelength where an excitation intensity is at least 60%, such as at least 70%, moreover at least 80%, particularly at least 90% of an excitation maximum of the luminescent material in the visible spectrum. In embodiments, the peak wavelengths ($\lambda$pb) may be selected in the blue wavelength range and apply to an excitation maximum of the luminescent material in the blue wavelength range. As such, the peak wavelength (λpb) in the blue wavelength range may be selected at a wavelength where an excitation intensity is at least 50%, such as at least 60%, especially at least 70%, moreover at least 80%, particularly at least 90% of an excitation maximum of the luminescent material in blue wavelength range. Especially, the peak wavelength (λpb) in the blue wavelength range may be selected at a wavelength where an excitation intensity is at least 70% of an excitation maximum of the luminescent material in the blue wavelength range. Hence, the light generating devices generating device light comprising visible light may especially generate blue light, and this blue light may comprise the majority of the converted light (i.e. the luminescent material light).

In further embodiments, the luminescent material may comprise different excitation intensities at least two different peak wavelengths (λp). Especially, the luminescent material may comprise different excitation intensities at least two different peak wavelengths (λpu) comprising UV radiation. In embodiments, the luminescent material may hence have different excitation intensities at least two different peak wavelengths ($\lambda p_1$,$\lambda p_2$).Especially, the luminescent material may have different excitation intensities at least two different peak wavelengths ($\lambda pu_1$,$\lambda pu_2$) comprising UV radiation.

In embodiments, the luminescent material may have different excitation intensities beyond the at least two different peak wavelengths ($\lambda pu_1$,$\lambda pu_2$) up to ($\lambda pu_k$). Therefore the light generating system may be configured to comprise a plurality of sets generating device light with different peak wavelengths (λpu). The different peak wavelengths (λpu) may especially be selected based on the different excitation intensities of the luminescent material. The at least two different peak wavelengths ($\lambda pu_1$,$\lambda pu_2$) or ($\lambda pu_1$,$\lambda pu_k$) of the light generating devices of at least two sets of light generating devices may be selected at specific wavelengths. The at least two different peak wavelengths ($\lambda pu_1$,$\lambda pu_2$) or ($\lambda pu_1$,$\lambda pu_k$) may be selected at wavelengths where excitation intensities are within the range of 0-50%, such as 0-40%, especially 0-30%, moreover 0-20%, of an excitation intensity of an adjacent excitation maximum of the luminescent material light.

Herein, an adjacent excitation maximum to a specific wavelength may refer to the excitation maximum of luminescent material light in closest proximity to the specific wavelength within the excitation spectrum. For example, an embodiment may comprise excitation maximums at 220 nm and 270 nm. Device light may be chosen to have a peak wavelength at 240 nm. Then, the adjacent excitation maximum to the peak wavelength of the device light is 220 nm. The excitation intensity at 240 nm in the excitation spectrum may be within the range of 0-50% of the excitation intensity at 220 nm.

In other embodiments, the at least two different peak wavelengths ($\lambda pu_1$,$\lambda pu_2$) or ($\lambda pu_1$,$\lambda pu_k$) may be selected at wavelengths where excitation intensities are lower than 20%, such as lower than 10%, moreover lower than 1%.

Especially, the at least two different peak wavelengths ($\lambda pu_1$,$\lambda pu_2$) of the light generating devices of at least two sets of light generating devices may be selected at wavelengths where excitation intensities are within the range of up to a maximum of 30% of an excitation intensity of an adjacent excitation maximum of the luminescent material light, such as within the range of 0.1-30%, especially within the range of 1-30%.

Hence, only a part of the device light comprising UV radiation may be converted by the luminescent material into converted (visible) light, i.e. luminescent material light, whereas the majority of the device light comprising UV radiation may be transmitted as UV radiation. Especially, in such embodiments, the peak wavelength (λpb) in the blue wavelength range may be selected at a wavelength where an excitation intensity is at least 80% of an excitation maximum of the luminescent material in the blue wavelength range.

Hence, in embodiments the majority of the device light comprising UV radiation may be transmitted as UV radiation, and the majority of converted light comprised by system light may be converted blue device light.

The system light may therefore comprise a combination of transmitted and converted light (i.e. device light and luminescent material light).

In specific embodiments, at least 40%, such as at least 50%, of the spectral power of the system light may be luminescent material light. This may be particularly beneficial for illumination purposes. Therefore, in embodiments, the light generating devices generating device light having a peak wavelength (λpb) in the visible spectrum may be the majority of the light generating devices comprised by the light generating system. However, in other embodiments the percentage of radiation in the UV wavelength range and the percentage of the radiation in the visible wavelength range may be controllable.

However, it may be advantageous for disinfection purposes if UV-light is (at least partly) transmitted rather than (fully) converted. Hence, in embodiments, the plurality of sets of light generating devices may comprise a set of light generating devices with a peak wavelength for which the luminescent material has a very low excitation intensity. This is discussed in more detail further below.

The light generating system may comprise a plurality of sets of light generating devices. Especially, the number of light generating devices in the sets may not necessarily be equal, for example, the light generating system may comprise a majority of the light generating devices of the at least one set generating device light comprising visible light.

In embodiments, the light generating devices may be configured according to increasing or decreasing excitation intensities of the luminescent material for the different excitation intensities at the different peak wavelengths. This may be done when there are at least three sets of light generating devices, such as in a symmetrical arrangement, like concentric, or a linear $C_{n3}B_{n2}A_{n1}B_{n2}C_{n3}$ arrangement, wherein A refers to light generating devices of a first type, like light generating devices generating device light with a peak wavelength (λpb) in the visible spectrum, and n1≥1, and B refers to light generating devices of a second type, such as light generating devices generating device light with a different peak wavelength ($\lambda pu_1$) in the UV wavelength range, wherein n2≥1, and C refers to light generating devices of a third type, such as light generating devices generating device light with a different peak wavelength ($\lambda pu_2$) in the UV wavelength range, wherein n3≥1, and wherein in specific embodiments n1>n2≥n3.

As mentioned before, the light generating system may, especially, comprise light generating devices configured in an array. In embodiments, the distribution of the light generating devices in the array may not necessarily be symmetric. Especially, the array may comprise a 2D distribution of light generating devices, wherein the central regions of the array may be referred to as the core of the array and the regions surrounding the central core may be referred to as the periphery of the array. The number of light generating devices in the core and the peripheral part of the array may vary (see below). The shape of the array may (also) vary in embodiments. Especially, the array may have a circular, or rectangular, or square, or pentagonal, or hexagonal arrangement of light generating devices. Especially, in embodiments, the distribution of the light generating devices in the array may essentially be symmetric.

Hence, in embodiments, the array may comprise a core array part including x1% of a total number of the light generating devices and a peripheral array part including x2% of the total number of the light generating devices. Further, a majority of the light generating devices for which peak wavelength of their device light the luminescent material has a relatively lower excitation intensity may be configured in the peripheral array part. This may, in embodiments, comprise the at least two sets of light generating devices generating device light comprising UV radiation. However, in embodiments, the peripheral array part may (also) comprise the light generating devices generating device light comprising visible light.

Further, in embodiments, a majority of the light generating devices for which peak wavelength of their device light the luminescent material has a relatively higher excitation intensity may be configured in the core array part. This may, in embodiments, be the light generating devices generating device light comprising visible light. Additionally, in embodiments, the light generating devices generating device light comprising UV radiation may (also) be configured in the core array part. Especially, x1% may be selected from the range 50-95%, such as 50-90%, especially 50-85%, moreover 50-75%. Furthermore, in embodiments, x2% may be selected from the range 5-50%, such as 10-50%, especially 15-50%, moreover 25-50%. Most especially, in embodiments x1%+x %2=100%. Hence, embodiments of the light generating system may have at least half the total number of light generating devices (with a peak wavelength for which the luminescent material has a high excitation intensity) configured in the core array part. Further, not more than half the total number of light generating devices (with a peak wavelength for which the luminescent material has a low excitation intensity) may be configured in the peripheral array part. Especially, a majority of the light generating devices of the at least one set of light generating devices generating device light comprising visible light, especially blue light, may be configured in the core array part.

In embodiments, at least 20% of the light generating devices may be light generating devices generating device light comprising visible light. Yet, in embodiments at least 10%, especially at least 15%, such as at least 20% of the light generating devices may be a first set of light generating devices generating device light comprising UV radiation. Yet, also in embodiments another at least 10%, especially at least 15%, such as at least 20% of the light generating devices may be the at least one other set of light generating devices generating device light comprising UV radiation. Hence, in such embodiments, at least 20%, especially at least 30%, such as at least 40% of the light generating devices may be comprised by a first set of light generating devices and at least one other set of light generating devices, both sets generating device light comprising UV radiation. In embodiments, at least 60% of the light generating devices may be defined by the light generating devices generating device light comprising visible light, and the at least two sets of light generating devices generating device light comprising UV radiation.

In embodiments, the array may comprise an edge array part comprising one or more rows. The edge array part may also be referred to as "edge array region" (or "end region"). Especially, the edge array part may comprise the majority of the light generating devices for which peak wavelength of their device light the luminescent material has the relatively lowest excitation intensity. The set of light generating devices (for example light generating devices with a peak wavelength in UV radiation range) may, in embodiments, be used for disinfection. Hence, it may be advantageous that the device light from such light generating devices is transmitted (rather than converted). Hence, in embodiments, the majority of the light generating devices configured in the edge array part may comprise the set of light generating devices other the light generating devices generating device light comprising visible light.

As mentioned before, the array may be a 1D or a 2D array of light generating devices. The edge array part in a 1D array may refer to the one or more light generating devices at the edge (or end) of the array of light generating devices, and the edge array part in a 2D array may refer to one or more rows of light generating devices at the edge of the array i.e. one or more rows of light generating devices may be the outermost rows of the array enclosing the remaining light generating devices. Especially, the light generating devices at the edge array part may have a peak wavelength for which the luminescent material has the lowest excitation intensity. Hence, the device light from the one or more light generating devices in the edge array part of the array may not (substantially) undergo conversion to light of high intensity. Especially, the device light from the one or more light generating devices in the edge array part of the array may have peak wavelengths at excitation intensities less than about 50% of the highest excitation maximum (in the UV-visible wavelength range). Therefore, in embodiments the device light from the majority of light generating devices at the edge array part may substantially be transmitted as opposed to converted. This may be particularly advantageous for disinfection purposes, for example the system light may comprise unconverted UV light (from the light generating devices configured at the edge array part).

In other embodiments, the array may not be subdivided into a core array part or an edge array part. Rather, the light generating devices may be homogenously distributed over the array. The homogenous distribution may be regular, random, or quasi random. As a result, the light generating devices of different types may not cluster together, such as clustering more than 3 light generating devices of the same type next to each other, such as clustering of more than 4 light generating devices of the same type next to each other, especially clustering of more than 5 light generating devices of the same type next to each other. Rather the light generating devices may be surrounded by light generating devices of at least 2 other types of light generating devices, such as at least 3 other types of light generating devices, up to n−1 other types of light generating devices. Hence the light generating devices may provide a homogenized device light comprising different peak wavelengths ($\lambda p$) comprising both visible light and UV radiation. Especially, such homogenized device light may comprise a radiant flux of device light over 75-99% of the luminescent material surface. The radiant flux of homogenized device light may comprise a range of +/−15% relative to an average radiant flux (of the respective (UV) device light) over the luminescent material surface.

Hence, the light generating devices, in embodiments, may comprise a fourth set of light generating devices configured to generate device light having a third peak wavelength ($\lambda pu_3$) in the UV wavelength range, or violet wavelength range (about 380-420 nm), or visible wavelength range. In embodiments, the light generating devices of the at least n sets may be configured according to increasing or decreasing excitation intensities of the luminescent material for the different excitation intensities at the different peak wavelengths. More in general, in embodiments, the system may comprise sets of $n^{th}$ light generating devices configured to generate $n^{th}$ device light having a $n^{th}$ peak wavelength (λn) in the UV wavelength range or visible wavelength range, wherein n is 3, 4, or 5 (wherein n=4, there is also a $3^{rd}$ set, and when n=5, then there are also a $3^{rd}$ and $4^{th}$ set, etc.). Hence, in embodiments, the luminescent material may especially be configured to convert at least part of the device light comprising visible light from a $1^{st}$ set of light generating devices into luminescent material light. In addition, the luminescent material may be configured to convert at least part of the device light comprising UV radiation from a $2^{nd}$ set of light generating devices, and/or at least part of the device light comprising UV radiation from a $3^{rd}$ set of light generating devices, and so forth, into luminescent material light.

In general, the n sets of light generating devices may comprise k different sets of light generating devices configured to generate device light comprising UV radiation. Hence, the k sets of light generating devices may generate device light with k different peak wavelengths (λpu) in the UV wavelength range. Especially, in embodiments, 2≤k≤n−1, such that when there are 5 sets (n=5) of light generating devices, k may be 2, 3, or 4 sets of light generating devices generating device light comprising UV radiation.

Herein, the luminescent material may comprise excitation intensities $f_k$ for the k different peak wavelengths respectively. In certain embodiments, the lower the excitation intensity $f_k$, the more peripheral the light generating devices may be configured. Hence, in a cross-sectional view there may be at least an arrangement according to $E_{n5}D_{n4}C_{n3}B_{n2}A_{n1}B_{n2}C_{n3}D_{n4}E_{n5}$ arrangement, wherein A refers to light generating devices of a first type, like light generating devices generating device light comprising visible light, and n1≥1, and B, C, D, E refer to light generating devices of a second type, such as light generating devices generating device light comprising UV radiation. In such a cross-sectional view, the excitation intensity $f_k$ may decrease for the more peripheral light generating devices, i.e. E, D, C, B. In other embodiments, the excitation intensity $f_k$ may be irrespective to the arrangement of light generating devices, such as when the light generating devices are homogenously distributed over the array (as described above).

It is noted that for specific peak wavelengths of the one or more light generating devices, the luminescent material may especially have a relatively high corresponding excitation intensity. However, for one or more other wavelengths, the luminescent material may have relatively lower excitation intensities. Or in other words, the excitation intensity may vary with wavelength. This may provide a (characteristic) excitation spectrum. Hence, when varying the emission wavelength of a light source, while maintaining its photon flux constant, the emission intensity of the luminescent material light will vary with excitation wavelength. Therefore, even would the light generating device generating device light comprising visible light, and the light generating devices generating device light comprising UV radiation, and optionally further light generating devices, have equal photon fluxes, the radiant fluxes of the luminescent material light may differ for the different light generating devices. In embodiments, it may be desirable to select the radiant fluxes of the light generating devices such, that the radiant flux of the luminescent material light downstream of the luminescent material (downstream of the respective light generating devices) may essentially be the same. In this way, a radiant flux of the luminescent material light over 75-99% of the luminescent material surface may (only) vary within a range of +/−15% relative to an average radiant flux over the luminescent material surface, even more especially over at least 85%, such as at least 90% of the luminescent material surface. In specific embodiments a radiant flux of the luminescent material light over at least 95% of the luminescent material surface may (only) vary within a range of +/−15% relative to an average radiant flux over the luminescent material surface. The variation may even be a bit smaller, such as within about +/−10%, such as within about +/−5%. For example, the luminescent material may have an increasing excitation intensity corresponding to the device light comprising visible light and the device light comprising UV radiation (i.e. in an increasing order of excitation intensity from device light comprising UV radiation to device light comprising visible light).

Hence, in specific embodiments the photon flux of the device light may spatially vary over the luminescent material. Alternatively or additionally, in specific embodiments the excitation wavelength of the device light may spatially vary over the luminescent material. In yet other embodiments, the light generating system may be configured such that photon fluxes of the (device light of the) light generating devices are essentially equal (over the luminescent material). In certain embodiments, the light generating system may be configured such that photon fluxes of the blue device light may be essentially equal (over the luminescent material). In other embodiments, the light generating system may be configured such that photon fluxes of the device light comprising UV radiation may be essentially equal (over the luminescent material). In further embodiments, the light generating system may be configured such that photon fluxes of the blue device light and the device light comprising UV radiation may be essentially equal (over the luminescent material). Especially, such embodiments may comprise a control system to control the photon fluxes to be essentially equal (over the luminescent material).

Especially, the light generating system may be configured such that radiant fluxes of the (device light of the) light generating devices may decrease with increasing number of the indication of the respective type of light generating devices, i.e. the radiant flux of the (device light comprising visible light of the) at least one set of light generating devices is larger than of the radiant flux of the (device light comprising UV radiation of the) at least two sets of light generating devices. Hence, at least 50%, such as at least 60%, moreover at least 70%, especially at least 80%, up to at least 90% of a radiant flux of the luminescent material light may be due to conversion of the device light having a peak wavelength (λpb) in the visible wavelength range, especially the blue wavelength range. Especially in embodiments, at least 80% of a radiant flux of the luminescent material light may be due to conversion of the device light having a peak wavelength (λpb) in the blue wavelength range. Yet, in embodiments in the range of 50-100%, such as in the range 60-99% of a radiant flux of the luminescent material light may be due to conversion of the device light having a peak wavelength (λpb) in the blue wavelength range. Hence, in embodiments in the range of 0-50%, such as in the range of 1-40% of a radiant flux of the luminescent material light may be due to conversion of the radiation with the at least two different peak wavelengths (λpu) in the UV wavelength range.

Here, the excitation intensities may be arranged in some embodiments such that they may have an increasing or decreasing trend in wavelength of the device light from the plurality of sets of light generating devices. However, in other embodiments, the excitation intensities may be arranged such that they may not have a trend in wavelength of the device light from the plurality of sets of light generating devices. Further, in embodiments, the light generating devices and the luminescent material may be further configured such that at least part of the device light comprising UV radiation is transmitted by the luminescent material. This may be particularly advantageous for disinfection purposes. Hence, in such an embodiment, the majority of UV light may be transmitted without a change in the wavelength of the UV light.

In embodiments, the plurality of sets of light generating devices may further comprise at least one set configured to generate device light having a peak wavelength (λpu) in the violet wavelength range. As described above, violet radiation may comprise radiation from the wavelength range of 380-420 nm. Hence, the system light may comprise light in the violet wavelength range, which may be relatively safe for human exposure yet retain (some) of the health/esthetic benefits of UV radiation.

In embodiments, (i) at least two of the at least three different sets of light generating devices may be configured to generate radiation having two different peak wavelengths (λpu) in a wavelength range selected from the group of violet radiation, UV-A radiation, UV-B radiation, Near UV-C radiation, and Far UV-C radiation and (ii) at least another one of the at least three different sets of light generating devices may be configured to generate radiation having a peak wavelength (λpb) in the visible wavelength range. In (other) embodiments, (i) at least two of the at least three different sets of light generating devices may be configured to generate radiation having two different peak wavelengths (λpu) in a wavelength range selected from the group of UV-A radiation, UV-B radiation, Near UV-C radiation, and Far UV-C radiation and (ii) at least another one of the at least three different sets of light generating devices may be configured to generate radiation having a peak wavelength (λpb) in the visible wavelength range.

Especially, in embodiments at least one of the at least three different sets of light generating devices may be configured to have a peak wavelength in the UV-A radiation range, and at least one other of the at least three different sets of light generating devices may be configured to have a peak wavelength in the UV-B radiation range.

With such embodiments, a plurality of wavelengths may be provided i.e. the system light may comprise a plurality of wavelengths. Especially, the system light may comprise at least two peak wavelengths (λpu) from the group of violet radiation, UV-A radiation, UV-B radiation, and Near UV-C radiation. In (other) embodiments, the system light may comprise at least two peak wavelengths (λpu) from the group of UV-A radiation, UV-B radiation, and Near UV-C radiation.

The majority of the device light comprising the aforementioned at least two peak wavelengths (λpu) may, in embodiments, be transmitted rather than converted (such as by the luminescent material). Further, in embodiments, the system light may comprise at least a peak wavelength (λpb) in the visible wavelength range. Yet further, in such an embodiment, a part of the visible light may be converted. Especially, a part of the visible light may be converted into white light and hence, the system light may also comprise white light. Therefore, in a specific embodiment, the system light may comprise transmitted light from the group of violet radiation, UV-A radiation, UV-B radiation, and Near UV-C radiation and (also) converted white light (such as from the group of UV-A radiation, UV-B radiation, and Near UV-C radiation and (also) converted white light). In a further specific embodiment, the sets of light generating devices generating device light comprising UV radiation may be at least three (k=3). In such an embodiment, each of the different peak wavelengths of the device light comprising UV radiation may be selected from the group comprising violet radiation, UV-A radiation, UV-B radiation, Near UV-C radiation, and Far UV-C radiation (such as from the group of UV-A radiation, UV-B radiation, Near UV-C radiation, and Far UV-C radiation). Especially, each different peak wavelength may be from a different type of aforementioned UV radiation. Hence, the system light may comprise transmitted light from the various different types of UV radiation.

In specific embodiments, the plurality of light generating devices may be configured in series. Especially, in embodiments all light generating devices may be configured in series. This may be convenient in that the management of power to the light generating devices may be simple to configure. Alternatively, in embodiments, the plurality of light generating devices may be configured in parallel, especially in embodiments all light generating devices may be configured in parallel. The choice of the configuration of the light generating devices in series or parallel may be in dependence of the desired arrangement of light generating devices in the array.

In specific embodiments, two or more sets may be controlled individually. Especially, in this way, the composition of wavelengths comprised by the system light may be selected. Hence, in embodiments, two or more of the at least three sets of light generating devices may be individually controllable. In embodiments, individually controllable sets may be controllable by a control system. More especially, in embodiments, three or more of the at least three sets of light generating devices may be individually controllable. Further, at least one or more sets of the at least two individually controllable sets of light generating devices may be configured to generate device light having a peak wavelength (λpb) in the visible wavelength range, such as especially in the blue wavelength range. Yet more especially, in embodiments, two or more sets configured to generate device light (λpb) in the blue wavelength range may be controlled individually. Especially, the at least one or more sets of individually controllable sets of light generating devices configured to generate device light (λpb) in the blue wavelength range may be controllable relative to the (individually or not individually controllable) sets of light generating devices configured to generate device light (λpu) comprising UV radiation. Yet more especially, in embodiments, each of the sets of light generating devices comprised by the light generating system may be controlled individually.

In embodiments, the light generating system may comprise a LED filament. Especially, an LED filament may be configured to provide LED filament light. The term "LED filament light" may refer to the light of the LED filament during operation of the LED filament. The LED filament may in embodiments comprises a plurality of LEDs, especially arranged in a linear array. The linear array may be a 1D or 2D array, of n*m LEDs, wherein n may in embodiments be selected from the range of 1-4, such as 1-3, like 1-2, such as in embodiments 1 or in embodiments 2, and m may be selected from the range of larger than n, such as especially selected from the range of at least 4 (when n<4), like at least 6, such as at least 8. Further, the LEDs may be arranged for emitting LED light e.g. of different colors or spectral power distributions. In embodiments, two or more LEDs may be configured to provide light having essentially the same spectral power distributions. Even more especially, in embodiments all LEDs may be configured to provide light having essentially the same spectral power distributions. In yet other embodiments, two or more LEDs may be configured to provide light having different spectral power distributions.

In embodiments, the LED filament may have a length L and a width W, with in specific embodiments L≥5W. The LED filament may be arranged in a straight configuration or in a non-straight configuration, such as for example a curved configuration, a (2D or 3D) spiral, or a helix.

In specific embodiments, the LEDs may be arranged on an (elongated) carrier like for instance a substrate. In embodiments, the (elongated) carrier may be rigid (made from e.g. a polymer, glass, quartz, metal, or sapphire) or flexible (e.g. made of a polymer or metal e.g. a film or foil).

In case the carrier comprises a first major surface and an opposite second major surface, the LEDs are arranged on at least one of these surfaces. In embodiments, the carrier may be light reflective, especially reflective for the filament light. In embodiments, the carrier may be light transmissive, such as translucent and in specific embodiments transparent.

In embodiments, the LED filament may comprise an encapsulant at least partly covering at least part of the total number of LEDs (of the plurality of LEDs). In specific embodiments, the encapsulant may also at least partly cover at least one of the first major or second major surface.

The encapsulant may comprise a polymer material which may in embodiments be flexible such as for example a silicone. In embodiments, the encapsulant may comprise a resin. In embodiments, the encapsulant may comprise one or more of a luminescent material and a light scattering material. Herein, especially the LED filament comprises at least the luminescent material. The one or more of the luminescent material and the light scattering material may be embedded in the encapsulant material, such as the polymer material. The luminescent material may especially be configured to at least partly convert LED light into converted light. The luminescent material may also be indicated as "phosphor". The luminescent material may comprise a phosphor such as an inorganic phosphor and/or quantum dots or rods.

Hence, the LED filament light may comprise in specific embodiments one or more of LED light and converted light ("luminescent material light").

In embodiments, the LED filament may comprise multiple sub-filaments.

As indicated above, the LED filament may in embodiments comprises a plurality of LEDs. However, the term LED in the context of LED filament, may also refer to solid state light sources (in general). Hence, the LED filament may comprise one or more of LEDs, laser diodes, and superluminescent diodes. Especially, the LED filament comprises a plurality of LEDs.

Especially, the LED filament may comprise the array of light generating devices. More especially, at least the at least two sets of light generating devices generating device light comprising UV radiation may be configured at one or both end parts of the LED filament. LED filaments may, in embodiments, comprise the plurality of sets of the light generating devices. Hence, the LED filament may, in embodiments, (also) provide system light. More especially, in embodiments the system light comprises LED filament light.

In certain embodiments, the LED filament may comprise the array of light generating devices. The light generating devices may be homogenously distributed over the array (as described above).

In embodiments, the light generating system may comprise a chip-on-board (or "COB") light generating device. Especially, the COB light generating device may comprise the plurality of sets of light generating devices. Here, the array may be a 2D arrangement of light generating devices. Especially, the 2D array may comprise a core array part and a peripheral array part. More especially, the core array part may be in the center of the COB light generating device with the peripheral array part configured around and enclosing the core array part. Further, the light generating system may, in embodiments, further comprise a luminescent layer comprising the luminescent material. Hence, the COB light generating device may provide system light comprising a combination of luminescent material light and device light. Especially, the luminescent material may be configured downstream of the chip-on-board light generating device. Here, downstream refers to elements configured further along the optical path of the light escaping the COB light generating device. As mentioned before, in embodiments, the peripheral array part may enclose the core array part. Especially, the light generating devices generating device light comprising visible light may be configured in the core array part and wherein the other light generating devices (especially the light generating devices generating device light comprising UV radiation) may be configured in the peripheral array part. More especially, the core array part comprises a center, wherein with increasing distance from the center the excitation intensity may decrease. In embodiments, the luminescent layer may be deposited on the COB.

The COB light generating device may, in embodiments, comprise a majority of the light generating devices in the core array part configured around a center, with the remaining light generating devices configured in the periphery. Especially, the device light comprising a peak wavelength with a higher excitation intensity may be configured in the center, for example the first set of the plurality of sets of light generating devices may be configured at the center, this may be followed by the second set around the first set, and so on. Hence, in such an embodiment, device light at the center of the array may undergo conversion to luminescent material light of the highest excitation intensity, and device light at the periphery may be transmitted with minimal conversion (or undergo conversion at lowest excitation intensity). Hence, this may provide the advantage of providing system light which may comprise light of a plurality of wavelengths in addition to transmitted UV light. Thus, the light generating system may provide illumination as well as be used for disinfection simultaneously.

In embodiments, the luminescent material may have a luminescent material surface. Especially, a radiant flux of the luminescent material light over 75-99%, such as 85-99%, especially 95-99% of the luminescent material surface may vary within a range of +/−15% relative to an average radiant flux over the luminescent material surface. There may be minor variations in the radiant flux over the surface of the luminescent material. However, in embodiments, the arrangement of the light generating devices in the array may be such that variation of the radiant flux over the majority of the luminescent material surface may especially be within a range of +/−25%, such as +/−15%, especially +/−10% relative to an average radiant flux over the luminescent material surface. Therefore, with such an embodiment, system light with a uniform radiant flux may be provided.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In embodiments, the light generating system may comprise a control system. Especially, the control system may be configured to control (or operate in a mode of operation), the one or more sets of light generating devices.

The term “controlling” and similar terms especially refer at least to determining the behavior or supervising the running of an element. Hence, herein “controlling” and similar terms may e.g. refer to imposing behavior to the element (determining the behavior or supervising the running of an element), etc., such as e.g. measuring, displaying, actuating, opening, shifting, changing temperature, etc. Beyond that, the term “controlling” and similar terms may additionally include monitoring. Hence, the term “controlling” and similar terms may include imposing behavior on an element and also imposing behavior on an element and monitoring the element. The controlling of the element can be done with a control system, which may also be indicated as “controller”. The control system and the element may thus at least temporarily, or permanently, functionally be coupled. The element may comprise the control system. In embodiments, the control system and element may not be physically coupled. Control can be done via wired and/or wireless control. The term “control system” may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions from a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Thread, WIFI, LiFi, ZigBee, BLE or WiMAX, or another wireless technology.

The system, or apparatus, or device may execute an action in a “mode” or “operation mode” or “mode of operation” or “operational mode”. The term “operational mode may also be indicated as “controlling mode”. Likewise, in a method an action or stage, or step may be executed in a “mode” or “operation mode” or “mode of operation” or “operational mode”. This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. “on”, without further tunability).

Hence, in embodiments, the control system may control in dependence of one or more of an input signal of a user interface, a sensor signal (of a sensor), and a timer. The term “timer” may refer to a clock and/or a predetermined time scheme.

In yet a further aspect, the invention also provides a lamp or a luminaire comprising the light generating system as defined herein. The luminaire may further comprise a housing, optical elements, louvres, etc. etc. . . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or “projector” or “image projector” may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, a photochemical reactor, and an optical wireless communication device, comprising the light generating system as defined herein. The light generating device may comprise a housing or a carrier, configured to house or support, one or more elements of the light generating system.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1:
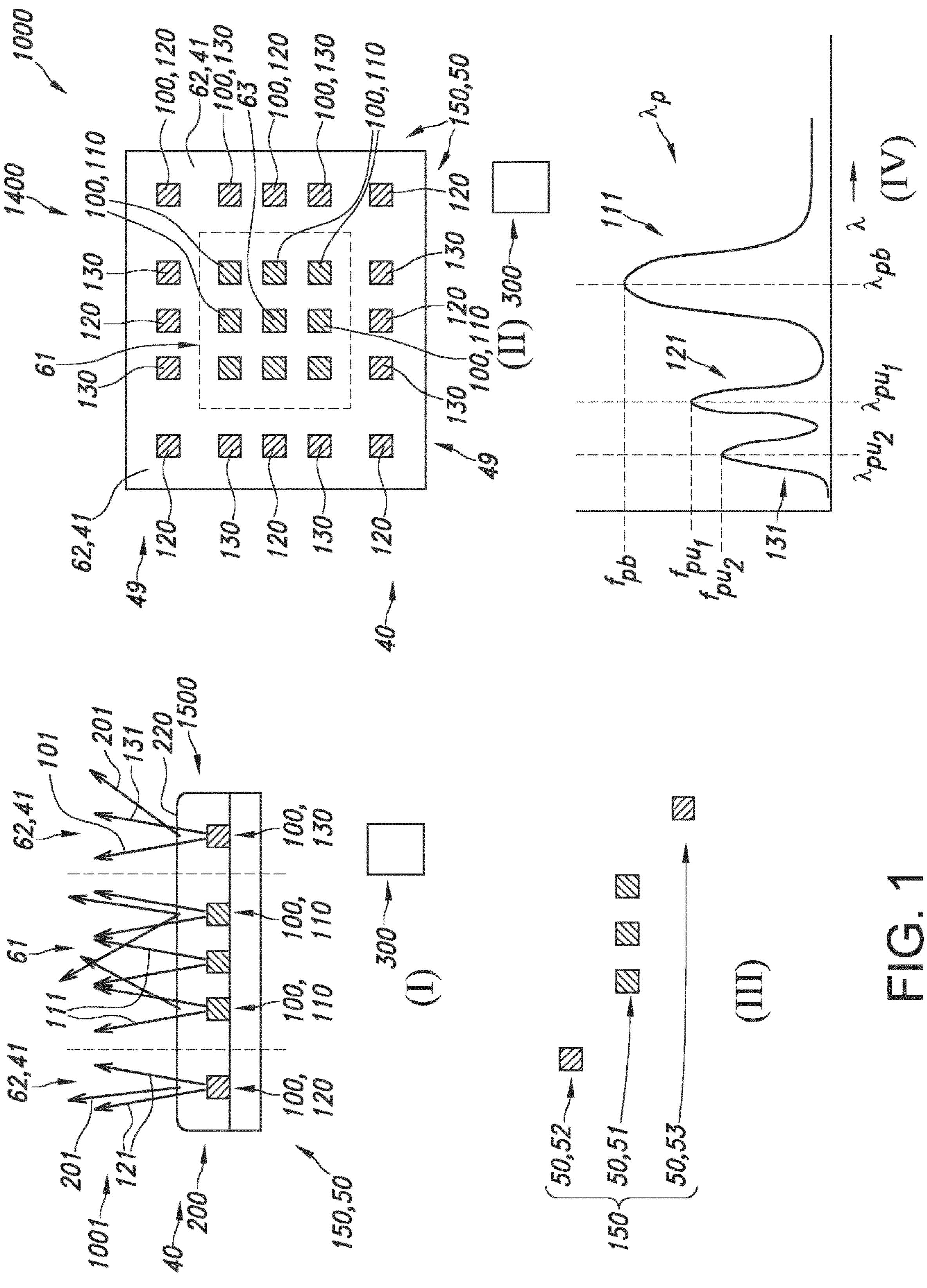
FIG. 1 schematically depicts the top and cross-sectional view of an embodiment of the light generating system. The figure (also) depicts the distribution of the wavelengths corresponding to the first second and third device light.

FIG. 1 schematically depicts the cross-sectional view (I) and top view (II) of an embodiment of the light generating system. Further, the figure depicts the plurality of sets of the one or more light generating devices (III). The figure (also) depicts an illustrative example of the spectral power distribution of the wavelengths corresponding to the device light (IV). Especially referring to embodiments I and II of FIG. 1, in embodiments, the invention may provide a light generating system 1000. Especially, the light generating system may comprise (a) a plurality of sets 150 of light generating devices 100 and (b) a luminescent material 200. The light generating devices 100 may be configured in an array 40. Further, the light generating devices 100 may be configured to generate device light 101. Especially, the light generating devices 100 may comprise solid state light sources. Further, in embodiments, the plurality of sets 150 of light generating devices 100 may comprise at least three sets 50 of light generating devices 100. Especially, light generating devices 100 of different sets may mutually differ in peak wavelengths λp of the device light 101. Especially, at least one set 50 of light generating devices 100 may be configured to generate device light 111 having a peak wavelength (λpb) in the visible wavelength range, especially the blue wavelength range. At least two different sets of light generating devices 100 may be configured to generate second device light 101 comprising UV radiation with at least two different peak wavelengths (λpu) in the UV wavelength range. Further, the difference between the at least two different peak wavelengths (λp) of the device light 101 may be at least 30 nm.

In embodiments, the luminescent material 200 may be configured downstream of the array 40 of light generating devices 100. Especially, the luminescent material 200 may be configured to convert at least part of the device light 111 into luminescent material light 201. Further, in embodiments, the luminescent material 200 may be configured to convert at least part of the device light 101 comprising UV radiation into luminescent material light 201. The device light 101 may comprise device light 121 from a second set of light generating devices 100 and device light 131 from a third set of light generating devices 100.

More especially, the luminescent material 200 may have different excitation intensities (fpb, $fpu_1$, $fpu_2$) at the respective different peak wavelengths (λpb, $\lambda pu_1$, $\lambda pu_2$) (see embodiment IV of FIG. 1). The different excitation intensities of the luminescent material in a specific embodiment are shown in (IV). By way of example, the excitation maxima may be, in the order of decreasing excitation intensity, about 455 nm, about 340 nm, and about 225 nm.

Hence, as schematically depicted, λpb may e.g. be about 455 nm, $\lambda pu_1$ may e.g. be about 340 nm, and $\lambda pu_2$ may e.g. be about 225 nm. However, in an example, while keeping λpb and $\lambda pb_1$ essentially the same, $\lambda pu_2$ may e.g. also chosen to be about at the minimum between the maxima at about 225 nm and 340 nm, or between the maxima at about 340 nm and 455 nm. Other embodiments, however, may also be possible. At least 80% of a radiant flux of the luminescent material light 201 may be due to conversion of the device light having a peak wavelength (λpb) in the visible spectrum, especially the blue wavelength range.

In embodiments, the light generating devices 100 and the luminescent material 200 may be configured such that at least part of the device light 101 comprising UV radiation with at least two different peak wavelengths (λpu) in the UV wavelength range is transmitted by the luminescent material 200 (see embodiment IV of FIG. 1, with the peak wavelengths indicated as $\lambda_{pu1}$ and $\lambda_{pu2}$). Especially, the light generating devices 100 and the luminescent material 200 may be configured such that at least part of the device light 111 may be transmitted by the luminescent material 200 and at least part of the device light 111 may be converted by the luminescent material 200 into luminescent material light 201.

Especially, the peak wavelength (λpb) in the blue wavelength range may be selected at a wavelength where an excitation intensity is at least 70% of an excitation maximum of the luminescent material 200 in the blue wavelength range.

In embodiments, the array 40 may comprise a core array part 61 including at least 50% of a total number of the light generating devices 100 and a peripheral array part 62 including less than 50% of the total number of the light generating devices 100. An embodiment of such is shown in (II). Especially, a majority of the light generating devices 100 for which peak wavelength of their device light 101 the luminescent material 200 has a relatively lower excitation intensity may be configured in the peripheral array part 62, and wherein a majority of the light generating devices 100 for which peak wavelength of their device light 101 the luminescent material 200 may have a relatively higher excitation intensity are configured in the core array part 61.

In embodiments, the luminescent material 200 may have a luminescent material surface 220. Especially, a radiant flux of the luminescent material light 201 over 75-99% of the luminescent material surface 220 may vary within a range of +/−15% relative to an average radiant flux over the luminescent material surface 220.

In embodiments, the array 40 may comprise an edge array part 41 comprising one or more rows 49. Especially, the edge array part 41 may comprise the majority of the light generating devices 100 for which peak wavelength of their device light 101 the luminescent material 200 has a relatively lowest excitation intensity.

The light generating system 1000, in embodiments, may comprise a chip-on-board light generating device 1400 comprising the array 40 of light generating devices 100 as shown in (II). Especially, the light generating system 1000 may further comprise a luminescent layer 1500 comprising the luminescent material 200 configured downstream of the chip-on-board light generating device 1400. Especially, the peripheral array part 62 may enclose the core array part 61. Further, the light generating devices of a first type 110, in embodiments, may be configured in the core array part 61 and wherein the other light generating devices 120, 130 may be configured in the peripheral array part 62. Especially, the core array part 61 may comprise a center 63, which with increasing distance of the center 63 the excitation intensity decreases.

Referring to e.g. embodiments I and II, the excitation wavelength of the device light 101 may thus spatially vary over the luminescent material 200.

Further, embodiment III schematically depicts an example of a plurality of sets 150 of light generating devices 100 that may comprise: (i) at least one set 52 configured to generate device light 101 having a peak wavelength λpb in the blue wavelength range, (ii) at least three sets 51 configured to generate device light 101 having a peak wavelength λpu in the UV wavelength range, and (iii) at least one set 53 configured to generate device light 101 having a peak wavelength λpu in the violet wavelength range.

In embodiments, (i) at least two of the at least three different sets 50 of light generating devices 100 may be configured to generate radiation having a peak wavelength in a wavelength range selected from the group of violet radiation, UV-A radiation, UV-B radiation, Near UV-C radiation, and Far UV-C radiation, and (ii) at least another one of the at least three different sets 50 of light generating devices 100 may be configured to generate radiation having a peak wavelength in the visible wavelength range. Moreover, each of the different peak wavelengths may be selected from the group comprising violet radiation, UV-A radiation, UV-B radiation, Near UV-C radiation, and Far UV-C radiation, especially with each from a different type of aforementioned UV radiation.

In embodiments, the luminescent material 200 may comprise a luminescent material of the type $A_3B_5O_{12}$:Ce, wherein A comprises one or more of Y, La, Gd, Tb and Lu, and wherein B comprises one or more of Al, Ga, In and Sc. In other embodiments, the luminescent material 200 may comprise a luminescent material of the type $M'_xM_{2-2x}AX_6$ doped with tetravalent manganese, wherein M' comprises an alkaline earth cation, wherein M comprises a cation, and x is in the range of 0-1, wherein A comprises a tetravalent cation, wherein X comprises a monovalent anion, at least comprising fluorine. Further, in embodiments, the system light may be white light having a correlated color temperature in a range from 1800 to 6500 K and a color rendering index of at least 80.

While white LED sources can give an intensity of e.g. up to about 300 lm/mm$^2$; static phosphor converted laser white sources can give an intensity even up to about 20.000 lm/mm$^2$. Ce doped garnets (e.g. YAG, LuAG) may be the most suitable luminescent convertors which can be used for pumping with blue laser light as the garnet matrix has a very high chemical stability. Further, at low Ce concentrations (e.g. below 0.5%) temperature quenching may only occur above about 200° C. Furthermore, emission from Ce has a very fast decay time so that optical saturation can essentially be avoided. Assuming e.g. a reflective mode operation, blue laser light may be incident on a phosphor. This may in embodiments realize almost full conversion of blue light, leading to emission of converted light. It is for this reason that the use of garnet phosphors with relatively high stability and thermal conductivity is suggested. However, also other phosphors may be applied.

In embodiments, all light generating devices 100 may be configured in series. Especially, two or more of the at least two sets 50 of light generating devices 100 may be individually controllable by a control system 300. At least one or more sets of the at least two individually controllable sets 50 of light generating devices 100 may be configured to generate device light 111 having a peak wavelength (λpb) in the blue wavelength range.

Figure 2:
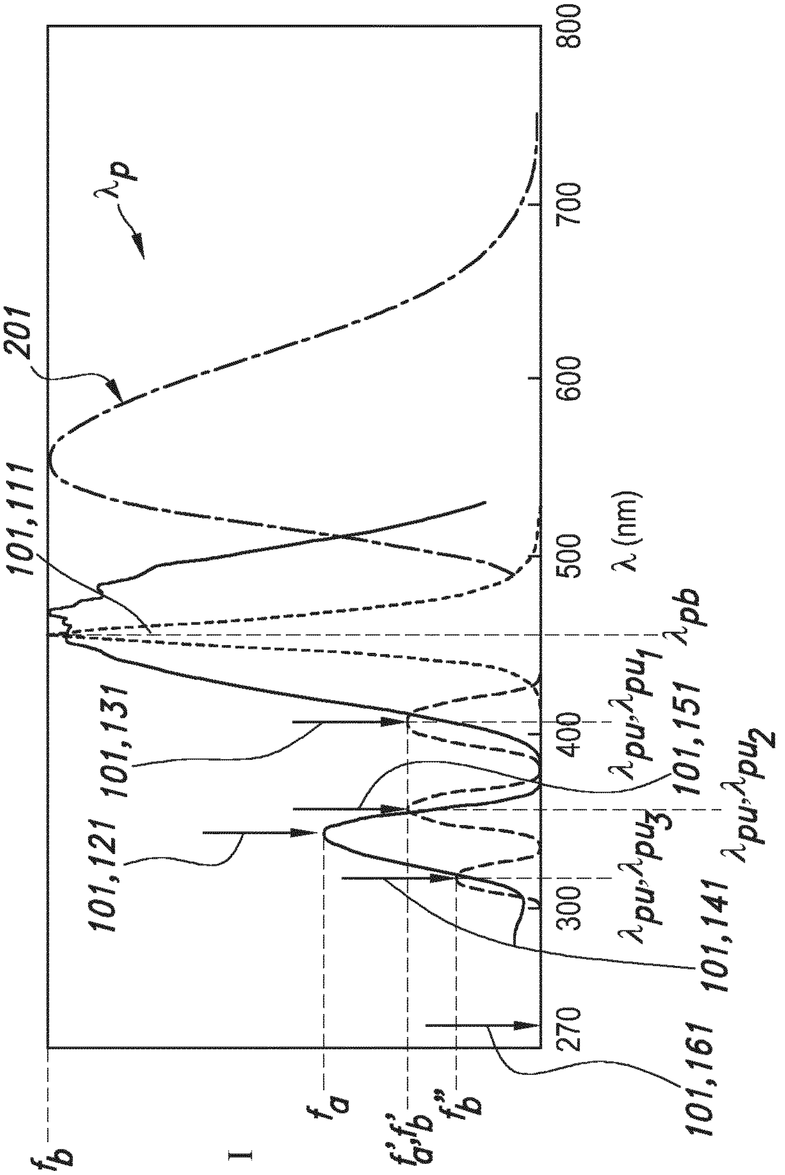
FIG. 2 schematically depicts the excitation spectra of the luminescent material.

FIG. 2 schematically depicts the excitation spectra of the luminescent material. In embodiments, the luminescent material 200 may have a relatively highest excitation intensity for the device light 111 comprising visible light. Especially, the luminescent material 200 may be configured to convert at least part of the device light 101 into luminescent material light 201. More especially, the luminescent material 200 may have different excitation intensities at the different peak wavelengths. In this figure, the solid lines depict the excitation spectra i.e. the wavelength of the incident device light 101 for which there is a corresponding emission spectra of luminescent material light 201 (of a different wavelength) depicted in dotted lines. Hence, in the depicted embodiment, the higher excitation intensity fb of the converted light 201 may correspond to the device light 111 comprising visible light having a peak wavelength λpb. The other wavelengths such as the device light 121 from a second type of light generating devices 120 may have a lower excitation intensity fa. The device light 131 from a third type of light generating devices 130 and device light 151 from a fifth type of light generating devices 150 may have relatively lower excitation intensities f'a' and f'b. Further wavelengths such as the device light 141 from a fourth type of light generating devices 140 may have a yet lower excitation intensity f'b. Moreover depicted is the wavelength spectrum of device light 161 from a possible sixth type of light generating devices that is not excited in the depicted embodiment.

Especially, the peak wavelength (λpb) in the blue wavelength range may be selected at a wavelength where an excitation intensity is at least 70% of an excitation maximum of the luminescent material 200 in the blue wavelength range. Further, the luminescent material 200 may comprise different excitation intensities for at least two different peak wavelengths ($\lambda pu_1$,$\lambda pu_2$). The at least two different peak wavelengths ($\lambda pu_1$,$\lambda pu_2$) of the light generating devices 100 of at least two sets 50 of light generating devices 100 may be selected at wavelengths where excitation intensities are within the range of a maximum of up to 30% of an excitation intensity of an adjacent excitation maximum of the luminescent material light 201. The peak wavelength (λpb) in the blue wavelength range may especially be selected at a wavelength where an excitation intensity is at least 80% of an excitation maximum of the luminescent material 200 in the blue wavelength range.

Figure 3:
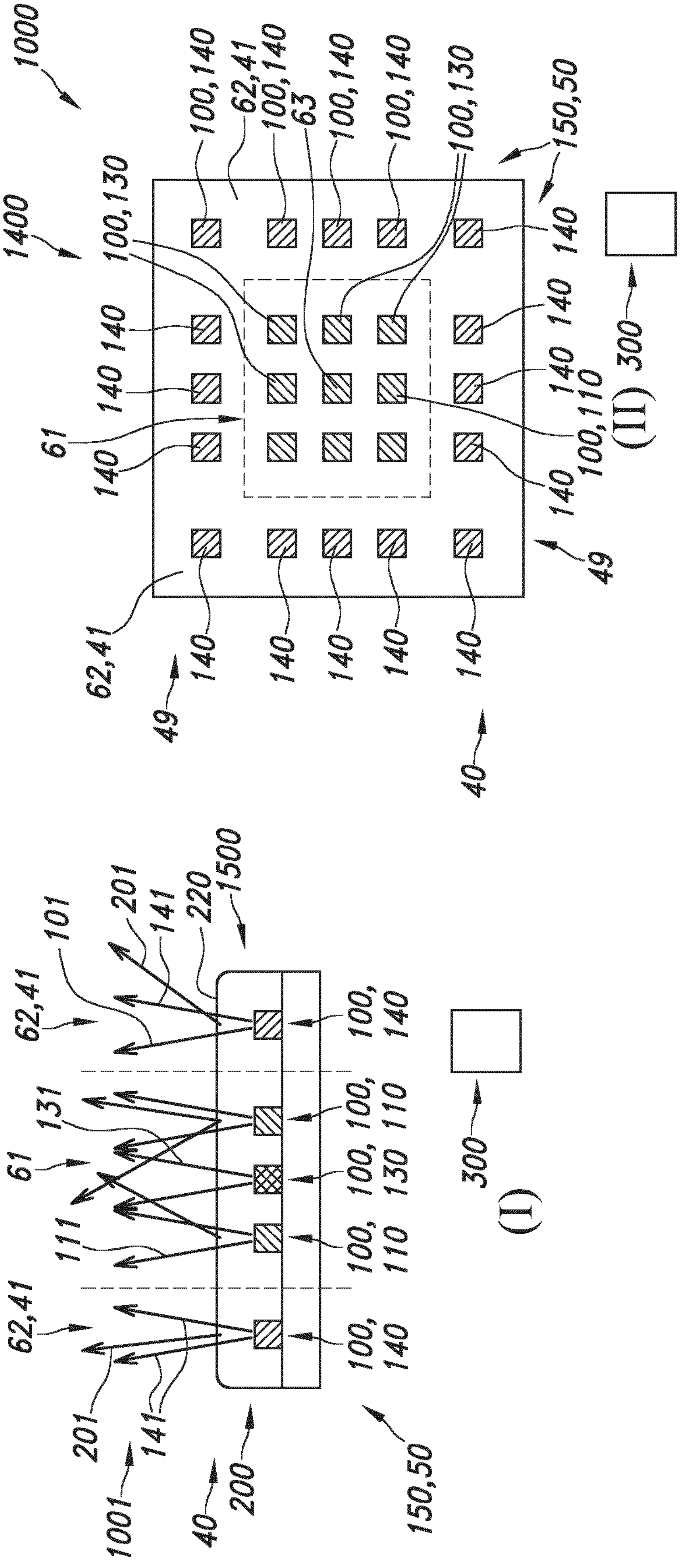
FIG. 3 schematically depicts the top and cross-sectional view of an embodiment of the light generating system.

FIG. 3 schematically depicts the cross-sectional view (I) and top view (II) of embodiments of the light generating system (similar to the views (I) and (II) shown in FIG. 1). Herein, the light generating devices 100 are homogenously distributed over the array 40 and comprise light generating devices 130 of a third type and light generating devices 140 of a fourth type. Especially, the device light from the one or more light generating devices in the edge array part of the array may have peak wavelengths at excitation intensities less than about 50% of the highest excitation maximum (in the UV-visible wavelength range).

Figure 4:
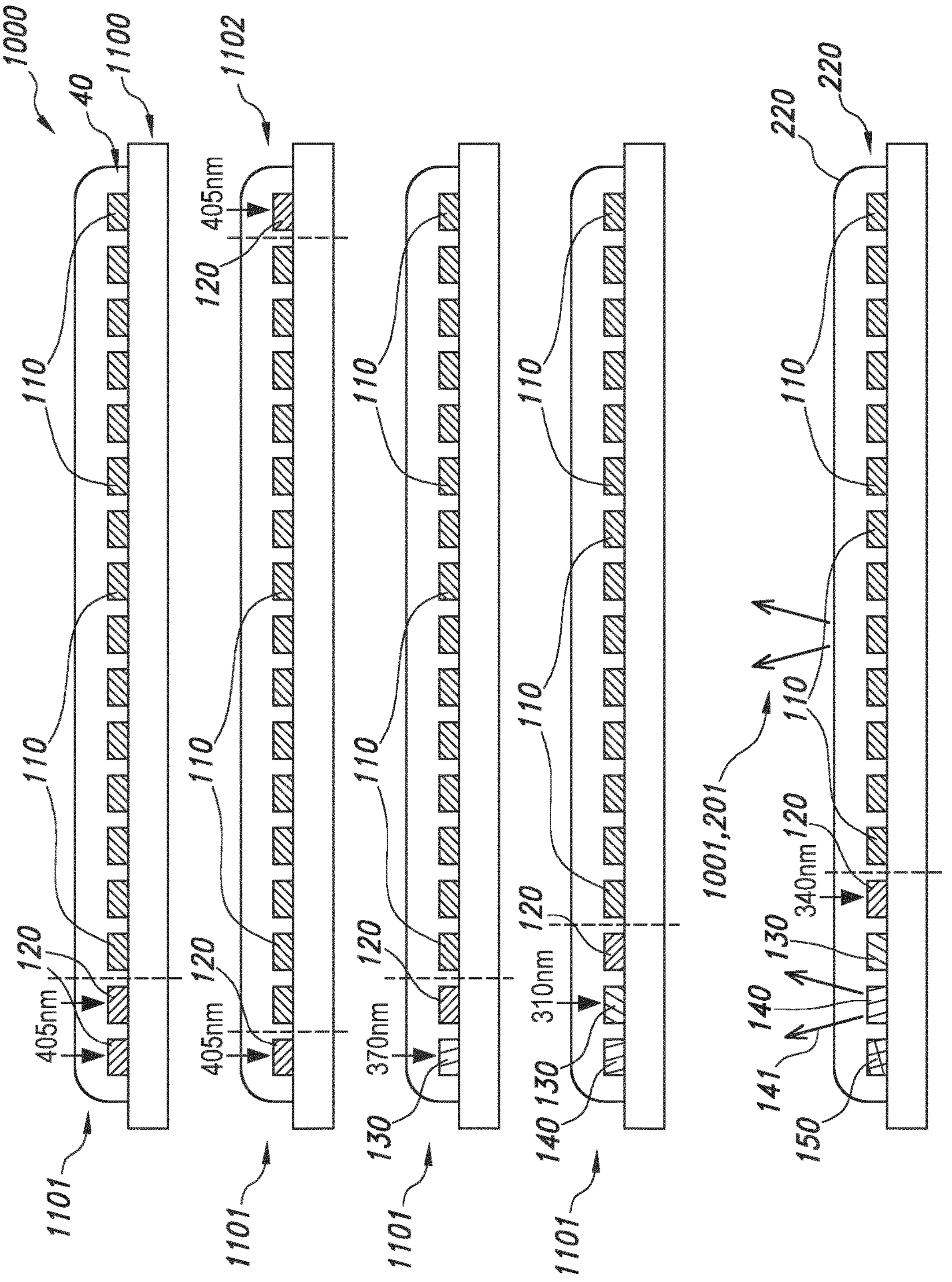
FIG. 4 schematically depicts an embodiment of a LED filament.

FIG. 4 schematically depicts several embodiments of the LED filament 1100. The light generating system 1000, in embodiments, may comprise a LED filament 1100. Especially, the LED filament 1100 may comprise the array 40 of light generating devices 100. Especially, at least a second set of light generating devices 120 and a third set of light generating devices 130 may be configured at one or both end parts 1101, 1102 of the LED filament 1100. Further, in embodiments, the plurality of sets 150 of light generating devices 100 may comprise at least n sets 50 of light generating devices 100. Especially n=4, wherein the light generating devices 100 comprise a fourth set of fourth light generating devices 140 configured to generate fourth device light 141 having a fourth peak wavelength (λ4) in the UV wavelength range or visible wavelength range.

Figure 5:
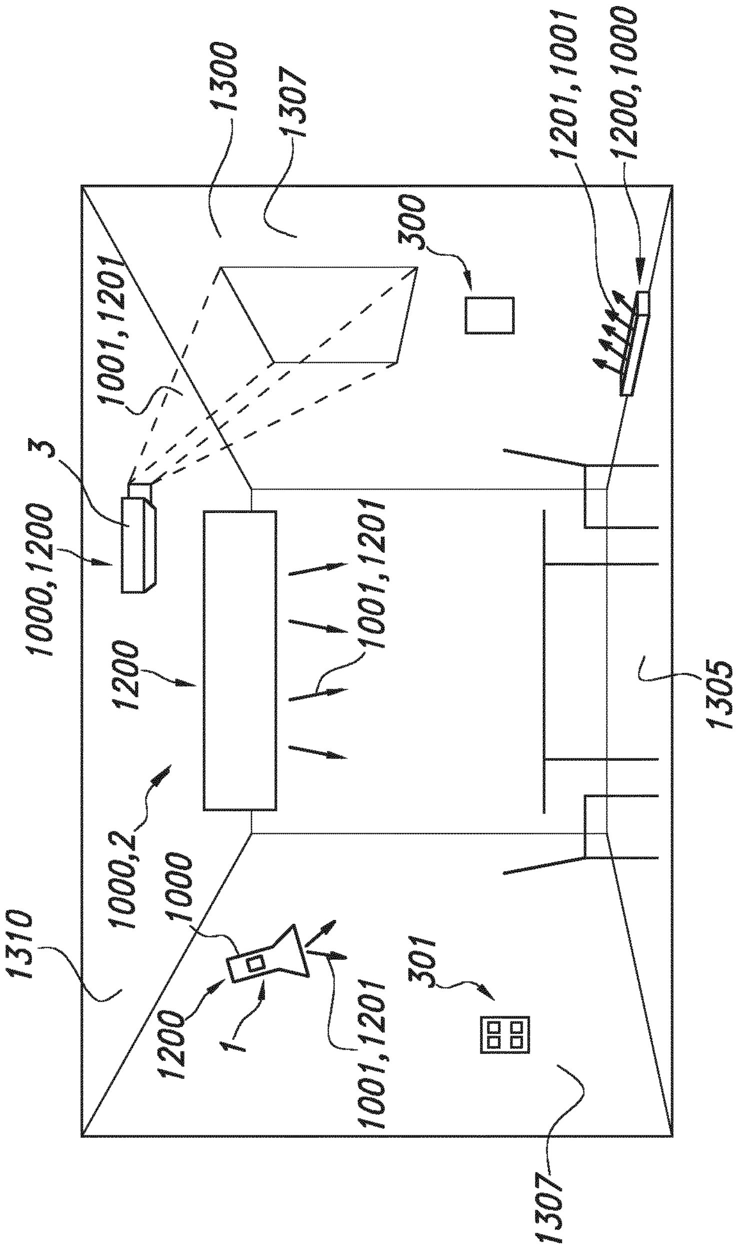
FIG. 5 schematically depicts an embodiment of a luminaire 2 comprising the light generating system 1000. The schematic drawings are not necessarily to scale.

FIG. 5 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of lamp 1 comprising the light generating system 1000. Reference 3 indicates a projector device or projector system, which may be used to project images, such as at a wall, which may also comprise the light generating system 1000. Hence, FIG. 4 schematically depicts embodiments of a lighting device 1200 selected from the group of a lamp 1, a luminaire 2, a projector device 3, a disinfection device, a photochemical reactor, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001. In embodiments, the light generating device 1200 may be configured provide system light 1001 on one or more surfaces in a room 1300. Especially, the light generating system 1000 may illuminate the walls 1307, or the floor 1305, or the ceiling 1310 in a room 1300.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising (a) a plurality of sets of light generating devices and (b) a luminescent material, wherein:

the light generating devices are configured in an array; the light generating devices are configured to generate device light; wherein the light generating devices comprise solid state light sources;

the plurality of sets of light generating devices comprises at least three sets of light generating devices, wherein the light generating devices of different sets mutually differ in peak wavelengths of the device light, wherein at least one set of light generating devices is configured to generate device light having a peak wavelength in the blue wavelength range of 420-495 nm, wherein at least two different sets of light generating devices are configured to generate device light comprising UV radiation with at least two different peak wavelengths in the UV wavelength range of 100-380 nm; and wherein the difference between the at least two different peak wavelengths of the device light is at least 30 nm;

the luminescent material is configured downstream of the array of light generating devices; wherein the luminescent material is configured to convert part of the device light into luminescent material light; wherein at least 80% of a radiant flux of the luminescent material light is due to conversion of the device light having the peak wavelength in the blue wavelength range;

the light generating devices and the luminescent material are configured such that at least part of the device light comprising the UV radiation with the at least two different peak wavelengths in the UV wavelength range of 100-380 nm is transmitted by the luminescent material; and the luminescent material comprises (a) a luminescent material of the type $A_3B_5O_{12}$:Ce, wherein A comprises one or more of Y, La, Gd, Tb and Lu, and wherein B comprises one or more of Al, Ga, In and Sc, and (b) a luminescent material of the type $M'_xM_{2-2x}AX_6$ doped with tetravalent manganese, wherein M' comprises an alkaline earth cation, wherein M comprises a cation, and x is in the range of 0-1, wherein A comprises a tetravalent cation, wherein X comprises a monovalent anion, at least comprising fluorine.

2. The light generating system according to claim 1, wherein the peak wavelength in the blue wavelength range is selected at a wavelength where an excitation intensity is at least 70% of an excitation maximum of the luminescent material in the blue wavelength range.

3. The light generating system according to claim 1, wherein the luminescent material comprises different excitation intensities at at least two different peak wavelengths; wherein at least two different peak wavelengths of the light generating devices of at least two sets of light generating devices are selected at wavelengths where excitation intensities are within the range of up to a maximum of 30% of an excitation intensity of an adjacent excitation maximum of the luminescent material light; and wherein the peak wavelength in the blue wavelength range is selected at a wavelength where an excitation intensity is at least 80% of an excitation maximum of the luminescent material in the blue wavelength range.

4. The light generating system according to claim 1, wherein the array comprises a core array part including at least 50% of a total number of the light generating devices and a peripheral array part including less than 50% of the total number of the light generating devices, wherein a majority of the light generating devices for which peak wavelength of their device light the luminescent material has a relatively lower excitation intensity are configured in the peripheral array part, and wherein a majority of the light generating devices for which peak wavelength of their device light the luminescent material has a relatively higher excitation intensity are configured in the core array part.

5. The light generating system according to claim 1, wherein the light generating devices are homogeneously distributed over the array.

6. The light generating system according to claim 1, comprising n sets of light generating devices, wherein the n sets of light generating devices comprise k different sets of light generating devices configured to generate device light comprising UV radiation with k different peak wavelengths in the UV wavelength range; wherein $n \geq 3$; wherein $2 \leq k \leq n-1$; wherein the luminescent material comprises excitation intensities $f_k$ for the k different peak wavelengths, wherein the lower the excitation intensity $f_k$, the more peripheral the light generating devices are configured.

7. The light generating system according to claim 6, wherein $k \geq 3$, wherein each of the different peak wavelengths are selected from the group comprising UV-A radiation in the wavelength range of 315-380 nm, UV-B radiation in the wavelength range of 280-315 nm, Near UV-C radiation in the wavelength range of 230-280 nm, and Far UV-C radiation in the wavelength range of 190-230 nm.

8. The light generating system according to claim 1, wherein the plurality of sets of light generating devices further comprises at least one set configured to generate device light having a peak wavelength in the violet wavelength range of 380-420 nm.

9. The light generating system according to claim 1, wherein the at least two different sets of light generating devices are configured to generate device light comprising UV radiation selected from the group comprising UV-A radiation in the wavelength range of 315-380 nm, UV-B radiation in the wavelength range of 280-315 nm, Near UV-C radiation in the wavelength range of 230-280 nm, and Far UV-C radiation in the wavelength range of 190-230 nm.

10. The light generating system according to claim 1, wherein the luminescent material comprises a luminescent material of the type $A_3B_5O_{12}$:Ce, wherein A comprises one or more of Y and Lu, and wherein B comprises one or more of Al, Ga, In and Sc, and a luminescent material of the type $M_2AX_6$ doped with tetravalent manganese, wherein M comprises a cation, wherein A comprises a tetravalent cation, wherein X comprises a monovalent anion, at least comprising fluorine.

11. The light generating system according to claim 1, wherein the plurality of sets of light generating devices are configured in series.

12. The light generating system according to claim 1, further comprising a control system, wherein two or more of the at least two sets light generating devices are individually controllable by a control system, wherein at least one or more sets of the at least two individually controllable sets of light generating devices is configured to generate device light having a peak wavelength in the blue wavelength range.

13. The light generating system according to claim 1, comprising:

a LED filament, wherein the LED filament comprises the array of light generating devices; wherein the light generating devices of the at least two different sets of light generating devices configured to generate device light comprising UV radiation are configured at one or both end parts of the LED filament; or a chip-on-board light generating device, wherein the chip-on-board light generating device comprises the plurality of sets of light generating devices; wherein the light generating system further comprises a luminescent layer comprising the luminescent material configured downstream of the chip-on-board light generating device.

14. The light generating system according to claim 1, wherein the luminescent material has a luminescent material surface, wherein the radiant fluxes of the light generating devices are selected such that a radiant flux of the luminescent material light over 75-99% of the luminescent material surface varies within a range of +/−15% relative to an average radiant flux over the luminescent material surface.

15. A lighting device selected from the group of a lamp, a luminaire, and an optical wireless communication device, comprising the light generating system according to claim 1.

* * * * *